US009516084B2

(12) United States Patent
Phillips et al.

(10) Patent No.: US 9,516,084 B2
(45) Date of Patent: Dec. 6, 2016

(54) SYSTEM AND METHOD FOR PRE-PROVISIONING ADAPTIVE BITRATE (ABR) ASSETS IN A CONTENT DELIVERY NETWORK

(71) Applicant: Ericsson Television Inc, Duluth, GA (US)

(72) Inventors: Chris Phillips, Hartwell, GA (US); Robert Hammond Forsman, Sugar Hill, GA (US); Jennifer Ann Reynolds, Duluth, GA (US)

(73) Assignee: ERICSSON AB, Stockholm (SE)

( * ) Notice: Subject to any disclaimer, the term of this patent is extended or adjusted under 35 U.S.C. 154(b) by 330 days.

(21) Appl. No.: 14/069,490

(22) Filed: Nov. 1, 2013

(65) Prior Publication Data
US 2015/0127844 A1    May 7, 2015

(51) Int. Cl.
G06F 15/16 (2006.01)
H04L 29/06 (2006.01)
H04L 29/08 (2006.01)

(52) U.S. Cl.
CPC ............ H04L 65/601 (2013.01); H04L 67/22 (2013.01); H04L 67/2847 (2013.01)

(58) Field of Classification Search
CPC ..... H04L 65/601; H04L 67/2847; H04L 47/22
See application file for complete search history.

(56) References Cited

U.S. PATENT DOCUMENTS

| 8,925,023 B2* | 12/2014 | Major | ................ H04N 21/8456 386/295 |
| 9,049,484 B2* | 6/2015 | Major | ................ G06F 21/6218 |
| 2007/0250560 A1 | 10/2007 | Wein et al. | |
| 2009/0083394 A1 | 3/2009 | Diot et al. | |
| 2009/0193485 A1 | 7/2009 | Rieger et al. | |
| 2010/0094960 A1 | 4/2010 | Zuckerman et al. | |
| 2010/0235528 A1 | 9/2010 | Bocharov et al. | |
| 2011/0161409 A1* | 6/2011 | Nair | ......................... G06F 8/38 709/203 |
| 2012/0124179 A1 | 5/2012 | Cappio et al. | |
| 2012/0151009 A1 | 6/2012 | Bouazizi et al. | |
| 2012/0198041 A1 | 8/2012 | Black et al. | |

(Continued)

FOREIGN PATENT DOCUMENTS

EP    2615777 A1    7/2013

OTHER PUBLICATIONS

Overview of MPEG-DASH Standard, Dynamic Adaptive Streaming over HTTP, ISO/IEC 23009-1. DASH Promoters Group. Aug. 11, 2011.

*Primary Examiner* — Moustafa M Meky
*Assistant Examiner* — Andrea Hurst

(57) ABSTRACT

A system and method for pre-provisioning ABR assets in a content delivery network (CDN). In an example, historical delivery patterns of one or more ABR assets downloaded at respective content delivery nodes of the CDN are monitored. For each content delivery node, one or more delivery rules may be determined based on statistical distributions of the ABR assets delivered over a period of time. When a particular content is determined to become popular at a specific content delivery node, a pre-provisioning policy may be modulated such that only certain representations or adaptation sets of the particular content's assets that pass the delivery rules are pre-provisioned for the specific content delivery node.

22 Claims, 13 Drawing Sheets

(56) References Cited

U.S. PATENT DOCUMENTS

| | | |
|---|---|---|
| 2012/0203873 A1 | 8/2012 | Lewin et al. |
| 2013/0144979 A1 | 6/2013 | Kansal et al. |
| 2013/0166690 A1* | 6/2013 | Shatzkamer ..... H04N 21/25891 709/219 |
| 2013/0304934 A1* | 11/2013 | Joch ..................... H04L 65/607 709/231 |
| 2014/0006951 A1* | 1/2014 | Hunter .................. H04H 60/31 715/719 |
| 2014/0082206 A1* | 3/2014 | Samuell ............. H04L 65/1069 709/227 |
| 2014/0181266 A1* | 6/2014 | Joch ..................... H04L 65/605 709/219 |
| 2014/0201334 A1 | 7/2014 | Wang et al. |
| 2014/0365613 A1 | 12/2014 | Phillips et al. |
| 2015/0012593 A1* | 1/2015 | Phillips ................ H04L 41/509 709/204 |
| 2015/0012656 A1* | 1/2015 | Phillips .................. H04L 47/20 709/226 |
| 2015/0026309 A1* | 1/2015 | Radcliffe ............. H04L 65/602 709/219 |
| 2015/0039680 A1* | 2/2015 | Gallant .................. H04L 65/60 709/203 |
| 2015/0081847 A1* | 3/2015 | Hao ....................... H04L 65/60 709/219 |
| 2015/0082345 A1* | 3/2015 | Archer ................. H04L 65/605 725/34 |
| 2015/0127844 A1* | 5/2015 | Phillips ................ H04L 65/601 709/231 |
| 2015/0127845 A1* | 5/2015 | Phillips ................ H04L 65/601 709/231 |
| 2015/0163273 A1* | 6/2015 | Radcliffe ............. H04L 65/602 709/231 |

* cited by examiner

SYSTEM AND METHOD FOR PRE-PROVISIONING ADAPTIVE BITRATE (ABR) ASSETS IN A CONTENT DELIVERY NETWORK

REFERENCE TO RELATED APPLICATION(S)

This application discloses subject matter that is related to the subject matter of the following U.S. patent application(s): (i) "BANDWIDTH POLICY MANAGEMENT IN A SELF-CORRECTED CONTENT DELIVERY NETWORK", application Ser. No. 13/935,381, filed Jul. 3, 2013, in the name(s) of Christopher Phillips et al., (ii) "SYSTEM AND METHOD FOR DELIVERING CONTENT IN A CONTENT DELIVERY NETWORK", application Ser. No. 13/935,326, filed Jul. 3, 2013, in the name(s) of Christopher Phillips et al., (iii) "DEFRAGMENTATION OF ADAPTIVE STREAMING SEGMENT FILES IN A CONTENT DELIVERY NETWORK", application Ser. No. 13/923,005, filed Jun. 20, 2013, in the name(s) of Christopher Phillips et al., and (iv) "SYSTEM AND METHOD FOR OPTIMIZING DEFRAGMENTATION OF CONTENT IN A CONTENT DELIVERY NETWORK", application Ser. No. 14/069,565, filed Nov. 1, 2013, in the name(s) of Christopher Phillips et al., each of which is hereby incorporated by reference in its entirety.

FIELD OF THE DISCLOSURE

The present disclosure generally relates to communication networks. More particularly, and not by way of any limitation, the present disclosure is directed to systems and methods for optimizing delivery of adaptive bitrate (ABR) assets in a content delivery network.

BACKGROUND

A content delivery network or CDN (sometimes also referred to as a content distribution network) typically distributes content in a "best effort" fashion across the nodes throughout a network using technologies such as adaptive bitrate (ABR) streaming. It is known, however, that ABR can result in unfair and sometimes incongruous apportionment of bandwidth in a network based upon the order multiple clients begin to use a network resource. Since the bandwidth usage is typically determined by a client requesting the content, and because the ABR clients can be opportunistic, they may become greedy. For instance, a client device that has a low resolution (e.g., a cellular phone) may end up consuming a disproportionate amount of the bandwidth when compared to the bandwidth required for a higher resolution device such as, e.g., a high-definition TV (HDTV). Issues pertaining to such misappropriation of bandwidth and/or uneven distribution of bandwidth resources in a CDN are expected to become even more pronounced when higher bandwidth options become available.

Relatedly, when clients access streaming content via a CDN, there may exist conditions at the content delivery nodes (i.e., serving nodes) of the CDN that result in fragmented content (e.g., incomplete copies of the content) locally stored at the content delivery nodes.

SUMMARY

The present patent disclosure is broadly directed to systems, methods, devices, apparatuses and associated computer-readable media for pre-provisioning ABR assets in a CDN based on historical delivery trends and utilizing the historical delivery trends in efficiently managing the retrieval of content segments that may be missing from the serving nodes' database caches.

In one aspect, an embodiment of a method operative at a management node associated with a CDN is disclosed. The claimed embodiment comprises, inter alia, obtaining historical delivery patterns of one or more ABR assets associated with one or more content delivery nodes of the CDN. For each content delivery node, one or more delivery rules may be determined based on statistical distributions of the ABR assets delivered over a period of time. When a particular content is determined to become popular at a specific content delivery node, a pre-provisioning policy may be modulated such that only certain representations or adaptation sets of the particular content's assets are pre-provisioned for the specific content delivery node based on the one or more delivery rules established for the specific content delivery node. In a further embodiment of a method, historical network conditions associated with one or more content delivery nodes of the CDN for delivery of one or more ABR assets may be monitored. Based on the historical network conditions, one or more delivery rules may be determined for each content delivery node. Additionally or alternatively, when a particular content is determined to become popular at a specific content delivery node, the CDN's pre-provisioning policies may be modulated based on the delivery rules such that only certain representations or adaptation sets of the particular content's assets that pass or otherwise satisfy the delivery rules are pre-provisioned for delivery at the specific content delivery node.

In another embodiment, a management node operative in association with a CDN is disclosed. The claimed embodiment may be configured as a computer-implemented data processing system and comprises, inter alia, one or more processors and a database for storing historical delivery patterns of one or more ABR assets downloaded at the CDN's delivery nodes. A delivery node management and control (DNMC) module may be embodied in a persistent memory coupled to the one or more processors, the DNMC module including program instructions executable by the one or more processors and configured to determine, for each content delivery node, one or more delivery rules based on statistical distributions of the ABR assets delivered over a period of time. Optionally, a content pre-provisioning control module embodied in a persistent memory may be provided, which is coupled to the one or more processors, the content pre-provisioning control module having program instructions executable by the one or more processors and configured to: when a particular content is determined to become popular at a specific content delivery node, apply the one or more delivery rules corresponding to the specific content delivery node against the particular content; and select or otherwise identify only certain representations of the particular content's assets for pre-populating delivery at the specific content delivery node based on the application of the delivery rules established for the specific content delivery node. In a still further embodiment, a management node operative with the CDN may include a database for storing historical network conditions associated with one or more content delivery nodes of the CDN, wherein a DNMC module embodied in the persistent memory may comprise program instructions executable by the one or more processors and configured to determine, for each content delivery node, one or more delivery rules based on the historical network conditions monitored for the ABR assets delivered over a period of time. When a particular content is determined to become popular at a specific content delivery node, the network condition-based delivery rules may be applied to select or otherwise identify only certain representations of the particular content's assets that pass the delivery rules for pre-populating relative to the specific content delivery node.

In another aspect, an embodiment of a method operative at a content delivery node for optimizing defragmentation of content is disclosed. The claimed embodiment comprises, inter alia, analyzing a manifest available to the content delivery node with respect to a particular content as well as segment files stored in a database cache of the content delivery node to determine if any segment files referenced by the manifest are absent from the database cache. If so, one or more delivery rules associated with the content delivery node may be applied to determine representations of the absent segment files that satisfy the one or more delivery rules. In one variation, the delivery rules may be established based on historical delivery patterns of one or more ABR assets downloaded at the content delivery node. In another variation, the delivery rules may be established based on historical network conditions of the content delivery node. After determining the compliant representations of the absent segment files, they may be pulled from another content delivery node of the CDN (e.g., a parent node or an edge server node).

In a further embodiment, a content delivery node configured to optimize content defragmentation is disclosed. The claimed content delivery node may be embodied as a computer-implemented data processing system comprising, inter alia, one or more processors and a database cache for storing segment files of content streamed to the content delivery node. A content defragmentation module embodied in a persistent memory is coupled to the one or more processors, wherein the content defragmentation module comprises program instructions executable by the one or more processors and configured to: analyze a manifest available to the content delivery node with respect to a particular content and segment files stored in the database cache in order to determine if any segment files referenced by the manifest are absent from the database; if so, apply one or more delivery rules associated with the content delivery node to determine representations of the absent segment files that satisfy the one or more delivery rules; and pull from another content delivery node of the CDN only the representations of the absent segment files satisfying the one or more delivery rules and store the pulled representations in the database cache.

In still further aspects, embodiments of a non-transitory computer-readable medium containing instructions stored thereon are disclosed for performing one or more embodiments of the methods set forth above. Additional features of the various embodiments are as recited in the dependent claims.

Advantages of the present invention include, but not limited to, providing a finer-grain control over pre-provisioning of ABR assets in a CDN, thereby resulting in more efficient usage of network resources. Not only are the operator bandwidth costs minimized (since the network operators no longer have to transmit assets, i.e., files, that are unlikely to be used, regardless of how popular a particular content is) but a higher quality of service may also be provided to the end users. Additionally, by optimizing content defragmentation at a CDN's delivery nodes on the basis of asset trend-based delivery rules and/or network condition-based delivery rules, further efficiencies may be gained. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
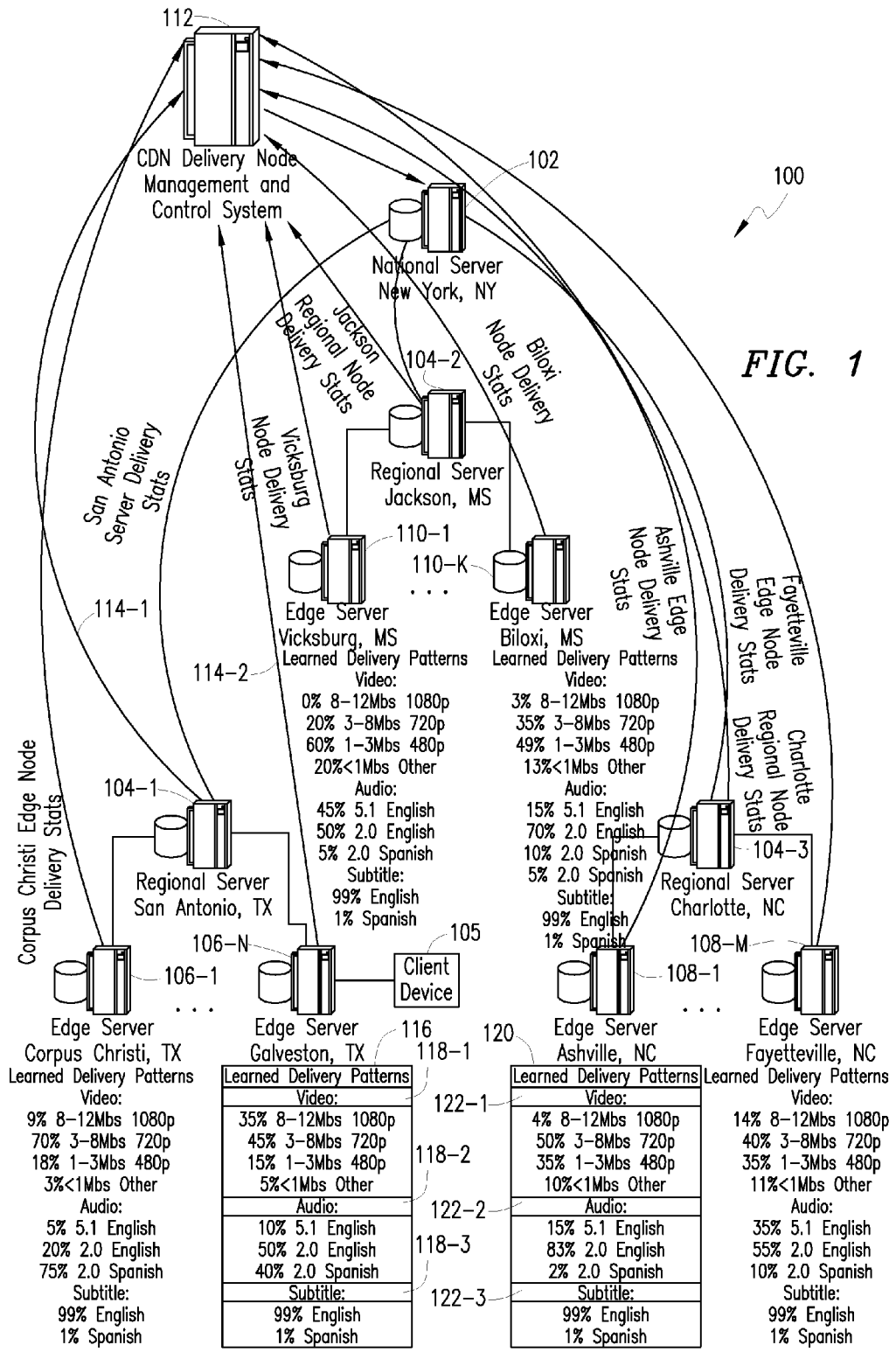
FIG. 1 depicts an example content delivery network wherein one or more embodiments of the present patent application may be practiced.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components-based details. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. Some network elements may comprise "multiple services network elements" that provide support for multiple network-based functions (e.g., content popularity policy management, session control, QoS policy enforcement, bandwidth scheduling management, subscriber/device policy and profile management, content provider priority policy management, streaming policy management, and the like), in addition to providing support for multiple application services (e.g., data and multimedia applications). Subscriber end stations or client devices may comprise any device configured to execute, inter alia, at least one streaming client application (e.g., an ABR streaming client application) for receiving content from a streaming server or content provider. Accordingly, such client devices may include set-top boxes, PVR/DVRs, workstations, laptops, netbooks, palm tops, mobile phones, smartphones, multimedia phones, Voice Over Internet Protocol (VOIP) phones, mobile/wireless user equipment, high definition TV terminals, portable media players, location-aware subscriber equipment, gaming systems or consoles (such as the Wii®, Play Station 3®, Xbox 360®), etc., that may access or consume content/services provided over a content delivery network in accordance with one or more embodiments set forth herein. Further, the client devices may also access or consume content/services provided over broadcast networks (e.g., cable and satellite networks) as well as a packet-switched wide area public network such as the Internet via suitable service provider access networks. In a still further variation, the client devices or subscriber end stations may also access or consume content/services provided on virtual private networks (VPNs) overlaid on (e.g., tunneled through) the Internet.

One or more embodiments of the present patent disclosure may be implemented using different combinations of software, firmware, and/or hardware. Thus, one or more of the techniques and blocks shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example content delivery network or CDN 100 wherein one or more embodiments of the present patent application may be practiced. For purposes of the present patent application, CDN 100 may comprise an overlay network architected for high-performance streaming of a variety of digital assets or program assets as well as services (hereinafter referred to as "media content") to subscribers using one or more Internet-based infrastructures, private/dedicated infrastructures or a combination thereof. In general, the terms "media content" or "content file" (or, simply "content") as used in reference to at least some embodiments of the present patent disclosure may include streaming digital assets and program assets such as any type of audio/video content or program segment, live or static (e.g., recorded over-the-air free network television (TV) shows or programs, pay TV broadcast programs via cable networks or satellite networks, free-to-air satellite TV shows, IPTV programs, etc.), Over-The-Top (OTT) and video-on-demand (VOD) or movie-on-demand (MOD) shows or programs, time-shifted TV (TSTV) content, as well as other content assets provided by content publishers, owners or providers, including but not limited to software files, executable computer code or programs, online electronic games, Internet radio shows/programs, entertainment programs, educational programs, movies, music video programs, and the like, that may be delivered using any known or heretofore unknown adaptive streaming technologies. Further, various programs or content files provided via streaming may be arranged as a collection or assembly of channels that are specific to different subscribers, wherein different channels may comprise media content from one or more content sources or originators.

By way of illustration, content may be delivered via CDN 100 using adaptive bit rate (ABR) streaming technologies and may be encoded to support known implementations such as Microsoft® Silverlight® Smooth Streaming, HTTP streaming (for instance, Dynamic Adaptive Streaming over HTTP or DASH, HTTP Live Streaming or HLS, HTTP Dynamic Streaming or HDS, etc.), Icecast, and so on. In general, the overlay architecture of CDN 100 may include a multi-level, hierarchically-organized interconnected assembly of network servers for providing media pathways or "pipes" from one or more central distribution nodes to one or more levels of regional distribution nodes that are connected to one or more local edge servers configured to serve a plurality of end users or subscribers in respective serving location areas. It should therefore be appreciated that a regional distribution node may operate as a parent node to one or more child edge servers and a central or national distribution node may in turn operate as a parent node to one or more child regional distribution nodes. Further, in addition to such "distribution servers" (sometimes also referred to as "content delivery nodes"), CDN 100 may also include and/or interoperate with various network elements configured to effectuate request redirection or rerouting mechanisms as well as related back office systems such as subscriber management systems, bandwidth scheduling systems, account/billing systems and the like, that may be deployed as part of a streaming network back office (not specifically shown).

As illustrated, CDN 100 is exemplified with a New York-based national server 102 coupled to regional distribution servers 104-1 to 104-3 based in San Antonio (TX), Jackson (MS) and Charlotte (NC), respectively. Regional distribution server 104-1 is adapted to serve a plurality of edge servers 106-1 to 106-N, exemplified by edge server 106-1 in Corpus Christi (TX) and edge server 106-N in Galveston (TX). Likewise, regional distribution server 104-2 is adapted to serve edge servers 110-1 (in Vicksburg, Miss.) to 110-K (in Biloxi, Miss.) and regional distribution server 104-3 is adapted to server edge servers 108-1 (in Ashville, N.C.) to 108-M (in Fayetteville, N.C.).

Each local edge server is operable to serve a plurality of subscribers in a serving area for delivering content to associated end stations or client devices, as illustrated by an example client device or user equipment (UE) device 105 that may for consume or access streaming content delivered via CDN 100 in any type or number of access technologies including broadband access via wired and/or wireless (radio) communications. For purposes of the present patent application, the terms "subscriber end station" and "client device" may be used synonymously and may comprise any UE device or appliance that in one implementation not only receives digital content assets for live viewing, playback and/or decoding the content, but also operates as a command console or terminal that can accept user inputs, commands or requests to interact with a network element disposed in CDN 100 and/or associated streaming server systems for requesting content that may be selectively rendered at an internal display screen and/or one or more external audio/visual (A/V) devices (not specifically shown). As such, the example client device 105 may include one or more streaming client modules (e.g., an ABR streaming client) and associated decoding functionalities depending on the streaming technologies implemented, each operating in association with a processor module and suitable memory and program code (not shown) for effectuating acquisition, decoding and rendering of the streamed media content.

As alluded to previously, CDN 100 may be configured to deliver content from live sources and/or static file sources using adaptive streaming wherein the content may comprise video components, audio track components as well as subtitle language components. Further, the video components of a particular content may be transcoded or otherwise encoded with different bit rates (e.g., multi-rate transcoding) using applicable encoder(s) (e.g., a particular program content may be transcoded into five video files using variable bit rates, ranging from low to high bit rates (500 Kbs to 12 Mbs, by way of illustration). The particular content's video component is therefore encoded as five different "versions" or "formats", wherein each bit rate may be referred to as a profile or representation. Also, the audio tracks associated with particular content may include different languages and encodings to support multi-lingual programming and different levels/types of audio quality experience. For instance, content may be available in multiple languages (e.g., English, French, Spanish, German, Chinese, etc.), each with several types of audio encoding: single channel (mono), two-channel (stereo), 5.1 surround sound, 7.1 surround sound, 7.2 surround sound, etc. Likewise, regardless of the languages of the main audio track of a content, various language choices for subtitles may also be provided with the content (e.g., English, Spanish, Japanese, Chinese, Korean, French, etc.).

For purposes of the present patent application, video, audio and subtitle components of the content that is distributed through CDN 100 may be referred to as "ABR assets". As the content is accessed, downloaded or otherwise consumed by the subscribers via the network of content delivery nodes of CDN 100, different consumption/downloading patterns may emerge with respect to the ABR assets. A delivery node management and control (DNMC) system 112 may be provided in association with CDN 100 as a management node adapted to monitor historical delivery trends and patterns of the ABR assets as well as network conditions associated with one or more content delivery nodes of CDN 100. As client devices 105 access various content via associated content delivery nodes over a configurable period of time, a historical delivery pattern learning and updating process is operative to obtain delivery statistics for each content delivery node on a component-by-component basis, i.e., video, audio or subtitles. In similar fashion, historical network conditions associated with each content deliver node may be obtained over a period (e.g., download rate distributions, bandwidth utilization and other performance metrics, relative performance comparisons against the performance of other content delivery nodes and/or predetermined performance thresholds, etc.), which may be utilized by DNMC system or node 112 for controlling content distribution through the network.

In certain embodiments, statistics associated with the edge server nodes may be directly provided to DNMC system 112, or indirectly via respective regional server nodes, which in turn may provide cumulative or aggregate statistics of the edge server nodes to DNMC system 112. By way of illustration, reference numeral 114-1 refers to a communication pathway for updating and/or otherwise providing delivery trends and other statistics to DNMC system 112 by a regional server node (e.g., San Antonio server 104-1). Likewise, a communication pathway 114-2 may be provided for updating and/or otherwise providing delivery trends and other statistics to DNMC system 112 by an edge server node (e.g., Galveston server 106-N). Based on the delivery statistics, a node-by-node delivery pattern may be established for each ABR asset component, which may involve determining statistical distributions, likelihood ranges, percentages, expectation values, etc. For example, an ABR asset delivery pattern 116 associated with the Galveston edge server 106-N includes a video component delivery pattern 118-1 that shows a distribution of various video bit rates (sometimes also referred to as bitrates) delivered from that server over a certain period of time (e.g., 35% of downloaded content being high definition, 1080p video encoded at 8-10 Mbs; 45% of downloaded content being high definition, 720p video encoded at 3-8 Mbs, and so on). An audio component delivery pattern 118-2 associated with the Galveston edge server 106-N likewise indicates a distribution of various languages and encodings used for all the audio tracks delivered from that server over a period of time (e.g., 10% of downloaded content being in English with 5.1 surround sound; 50% of downloaded content being in English with 2.0 stereo; and 40% of downloaded content being in Spanish with 2.0 stereo). As to subtitles, a corresponding delivery pattern 118-3 associated with the Galveston edge server 106-N shows a distribution wherein 99% of downloaded subtitles being in English and the remaining 1% of downloaded subtitles being in Spanish.

In comparison, an ABR asset delivery pattern 120 associated with the Ashville edge server 108-1 is illustrated with a different set of video, audio and subtitle distributions. As shown in FIG. 1, the ABR asset delivery pattern 120 includes a video component delivery pattern 122-1 that exemplifies a distribution of various video bit rates delivered from that server over a certain period of time, with a relatively low percentage (4%) of downloaded content being high definition, 1080p video encoded at 8-10 Mbs, for instance. Likewise, an audio component delivery pattern 122-2 associated with the Ashville edge server 108-1 indicates an audio track language distribution having a significantly lower percentage of Spanish language (e.g., 2% of downloaded content). A subtitle delivery pattern 120-3 is indicative of a distribution of the subtitle selections downloaded from the Ashville edge server 108-1 over a period of time that is substantially similar to the subtitle delivery pattern 118-3 associated with the Galveston edge server 106-N.

In accordance with teachings of the present patent application, DNMC system 112 is operative to determine or otherwise establish one or more delivery rules that may be based on the differential statistical distributions of various ABR asset delivery patterns and/or historical network conditions associated with respective content delivery nodes of CDN 100. Additionally, such delivery rules may be advantageously applied for modulating or otherwise controlling content pre-provisioning techniques (e.g., based on popularity determinations), defragmentation methodologies, push-based content delivery policies, etc. that may be implemented within CDN 100 for purposes of efficient resource utilization, optimized user experience, bandwidth management, and the like, as will be set forth in additional detail hereinbelow.

Figure 2:
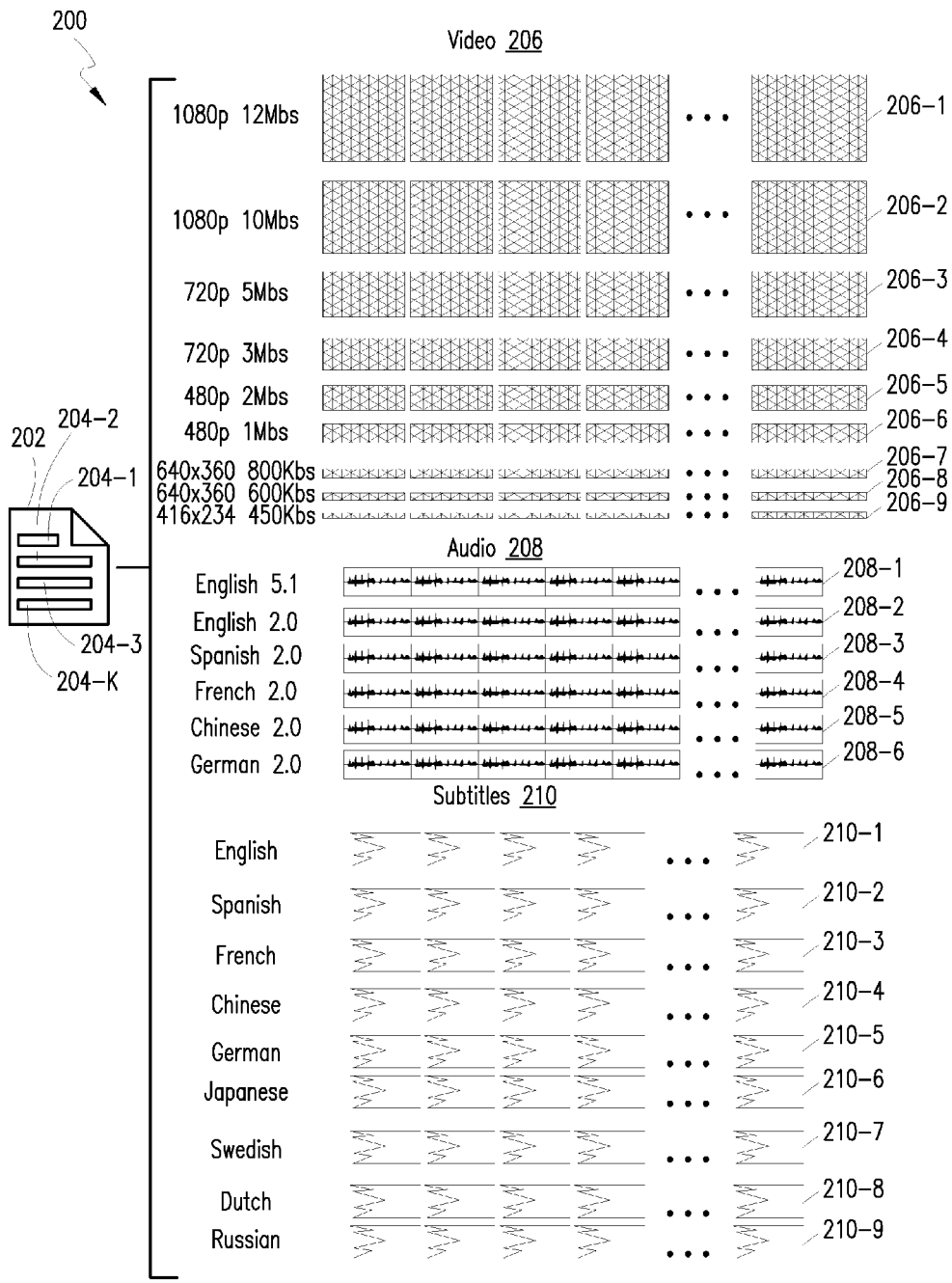
FIG. 2 depicts an example manifest including references to one or more content representations or adaptations sets relative to video, audio and subtitle components of a particular content.

FIG. 2 depicts an example ABR asset package 200 relative to a particular content (e.g., Movie X) that may be available for distribution throughout a CDN such as CDN 100, wherein the delivery of one or more portions of the ABR asset package may be modulated or otherwise controlled according to an embodiment of the present patent application. A manifest file 202 (also known as Media Presentation Description or MPD model in MPEG-DASH standard ISO/IEC 23009-1) is operative to describe available content components, including references to one or more content representations or adaptations sets relative to video, audio and subtitle components of the particular content. In respect of video asset components, the manifest 202 may describe segment information such as timing, Universal Resource Locators (URLs) pointing to segments as well as media characteristics such as video resolution and bit rates. In an embodiment where the manifest 202 is provided as a master manifest, it may include a plurality of child manifests 204-1 to 204-K, each referencing a particular combination of video, audio and subtitle asset components of Movie X. By way of illustration, a video component portion 206 of the ABR asset package 200 includes media segments encoded at a number of bit rates, each having certain video quality. For example, reference numeral 206-1 refers to high definition 1080p media segments encoded at 12 Mbs. Likewise, reference numerals 206-2 to 206-9 refer to media segments whose video is encoded at rates all the way down to 450 Kbs. An audio component portion 208 of the ABR asset package 200 includes multiple languages of Movie X, each being encoded for different audio quality experiences. Reference numerals 208-1 to 208-6 refer to six asset components, English 5.1 (surround sound), English 2.0 (basic stereo), Spanish 2.0, French 2.0, Chinese 2.0 and German 2.0, respectively. A subtitles component portion 210 includes a plurality of subtitle language selections provided for Movie X, with English 210-1 to Russian 210-9 being illustrative.

Figure 3:
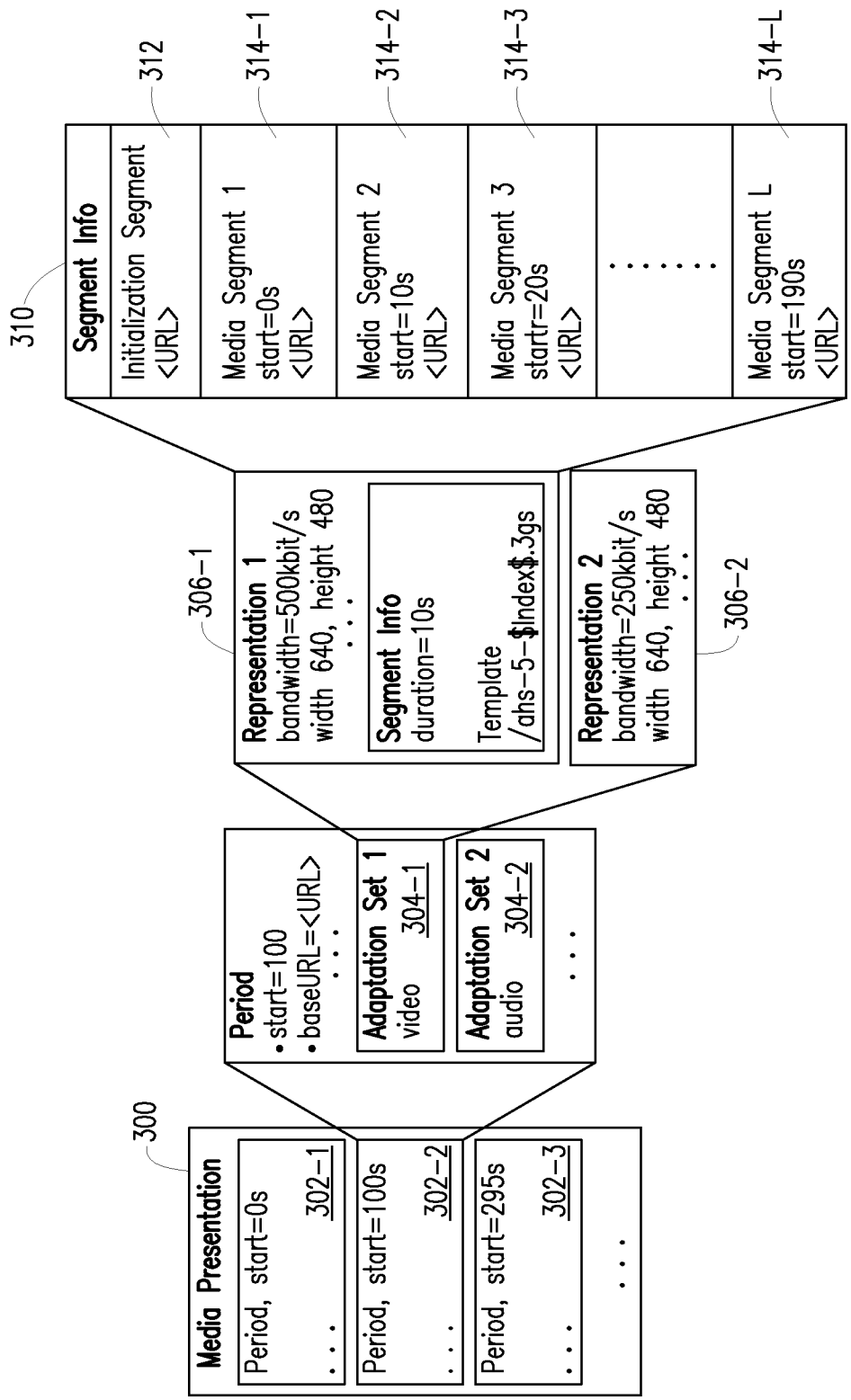
FIG. 3 depicts an example Media Presentation Description (MPD) model of a manifest illustrative of further details relative to different media segments of a particular content.

FIG. 3 depicts an example Media Presentation Description model of a manifest, e.g., MPD 300 that is illustrative of further details relative to different media segments of a particular content. A plurality of arbitrarily spliced content portions 302-1 to 302-3 describe the spliced portions' respective timing and base URL parameters, each including one or more adaptation sets for different asset components. As illustrated, reference numerals 304-1 and 304-2 respectively refer to a video adaptation set and an audio adaptation set of segment 302-2. The video adaptation set 304-1 in turn includes two representations 306-1 and 306-2, each having respective bit rates, display resolutions, etc, in addition to the segment information 310. By way of further illustration, segment information 310 includes an initialization segment 312 as well as URLs to a plurality of media segments 314-1 to 314-L, each segment having a suitable timing parameter. Those skilled in the art should recognize that the ABR asset package 200 shown in FIG. 2 may be described in a suitable MPD model representation similar to MPD 300 shown in FIG. 3 in a particular implementation that is compliant with the MPEG-DASH standard.

Figure 4:
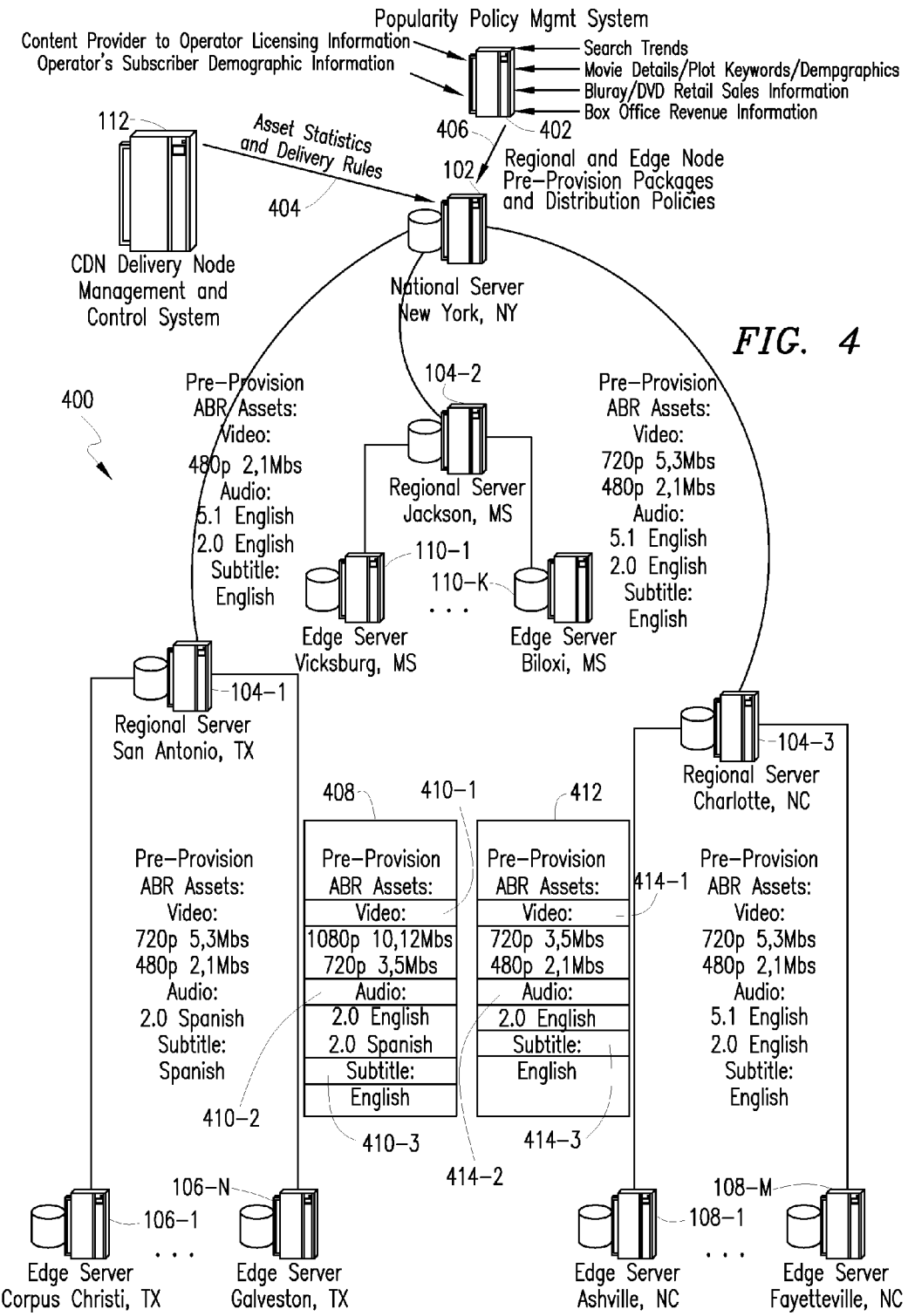
FIG. 4 depicts an example content delivery network wherein content is pre-provisioned based on historical delivery trends according to an embodiment of the present patent application.

FIG. 4 depicts an example content delivery network 400 wherein content may be pre-provisioned based on historical delivery trends according to an embodiment of the present patent application. For purposes of illustration, CDN 400 is identical to CDN 100 shown in FIG. 1 except that a popularity policy management system 402 is provided for determining or otherwise estimating or predicting where a particular content might become popular. As described in the commonly assigned patent applications (i) "BANDWIDTH POLICY MANAGEMENT IN A SELF-CORRECTED CONTENT DELIVERY NETWORK", application Ser. No. 13/935,381, filed Jul. 3, 2013, and (ii) "SYSTEM AND METHOD FOR DELIVERING CONTENT IN A CONTENT DELIVERY NETWORK", application Ser. No. 13/935,326, filed Jul. 3, 2013, incorporated by reference hereinabove, the popularity policy management system 402 is operative to estimate or determine a particular content's popularity by location and subscriber demographics based on a plurality of information sources, e.g., search trend data relative to a particular content to be distributed in a geographical region serviced by CDN 400 (for instance, Internet search engine trend data using search engines offered by Google®, Bing®, Yahoo®, and the like, as well as social media search trend data, e.g., searches on Facebook®, Twitter®, Instagram®, Pinterest®, and the like), in addition to trends relating to content/movie details, plot keyword search data, marketing data (e.g., box office revenue data, stored media (e.g., Blu-Ray, DVD, HD, and CD discs) sales data and related content sales data (collectively, "revenue information"). Further, the popularity policy management system 402 may be configured to interface with a content policy management node (not explicitly shown) for receiving applicable licensing information an/or content-based priority levels and weights. Upon determining popularity estimations for a particular content, the popularity policy management system 402 is operative to provide pre-provisioning and distribution policies to a central distribution node and/or regional server nodes, as exemplified by a communication path 406. Additional details regarding the establishment of content-specific pre-provisioning and distribution policies may be found in one or more of the foregoing commonly assigned patent applications, referenced hereinabove.

Further, DNMC system 112 is operative to provide one or more delivery rules established or otherwise determined for the respective content delivery nodes (e.g., regional server nodes and/or edge server nodes) based on the nodes' ABR asset delivery/distribution patterns. In one embodiment, DNMC system 112 is further operative to apply such delivery rules (which may comprise upper/lower thresholds and/or ranges for video bit rates, limits based on language/subtitle selection percentages, and the like) in conjunction with the pre-provisioning and distribution policies for a particular ABR asset package such that only certain representations or versions of the content which satisfy or otherwise pass the delivery rules may be pre-provisioned. In another embodiment, applicable delivery rules may be transmitted to a central distribution node and/or regional distribution nodes, as exemplified by a communication path 404, which distribution node may then apply the delivery rules in order to select a subset of the video/audio/subtitle assets for pre-provisioning relative to a plurality of the edge server nodes where the content has been determined to be popular. In a still further embodiment, both the popularity-based pre-provisioning policies as well as node-specific asset trend delivery rules may be provided to another network element or management node that is adapted to apply suitable selection/filtering logic in order for establishing filtered or otherwise modulated pre-provisioning policies with respect a particular content's ABR assets. In such a scenario, modulated pre-provisioning policies may be transmitted to the central/regional distribution nodes of CDN 400 and a subset of the ABR assets may be appropriately pre-provisioned in accordance therewith.

Additionally or alternatively, DNMC system 112 may also provide one or more delivery rules established or otherwise determined for the respective content delivery nodes based on the nodes' the historical network conditions. Similar to the application of the asset trend-based delivery rules, network condition-based delivery rules may be applied for modulating or otherwise controlling the pre-provisioning policies established by the popularity policy management system 402. It should be appreciated by one skilled in the art that the network condition-based delivery rules may be applied in various implementations similar to the embodiments described above, in addition to being applied in conjunction with the asset trend-based delivery rules for further refinement of a CDN's pre-provisioning policies.

Continuing to refer to FIG. 4, the modulated pre-provisioning of ABR assets with respect to edge server nodes 106-N and 108-1 based on respective node's delivery patterns may be further exemplified. As described previously, the ABR asset delivery pattern 116 associated with the Galveston edge server 106-N shows a video component distribution wherein more than 80% of the content is of higher bitrate category (i.e., 720p content at 3-8 Mbs or 1080p content at 8-12 Mbps). Accordingly, a delivery rule may be established wherein only higher bitrate representations of a particular content (e.g., Movie Y) may be pre-provisioned for the Galveston node 116-N. When such a rule is applied with respect to a particular content that has been estimated to become popular at this node, a pre-provisioned ABR asset package 408 for the node will include only 720p and 1080p representations of the content (encoded at, for example, 3/5 Mbs and 10/12 Mbs, respectively), as illustrated by a video asset component 410-1. Likewise, given that the historical audio asset delivery pattern for the Galveston node 116-N is where only 10% of the content has been in English with surround sound (5.1), a delivery rule may be such that 5.1 English language representations of a content's audio assets are excluded from pre-provisioning. In similar fashion, consistent with the distribution of historical subtitle languages downloaded at the Galveston node 106-N, a delivery rule for the subtitles may be one where any subtitles having a least likelihood of being downloaded from that node (e.g., less than 5%) are excluded from pre-provisioning. By applying such delivery rules, it can be seen that the pre-provisioned ABR asset package 408 relative to Movie Y for the Galveston node 106-N will include an audio asset component 410-2 comprising only English 2.0 and Spanish 2.0 representations (or adaptation sets) and a subtitle asset component 410-3 comprising only English language subtitles of Movie Y, which has been estimated to become popular in the area serviced by the Galveston node 106-N.

In similar fashion, one or more delivery rules based on the learned ABR asset delivery pattern 120 associated with the Ashville edge server 108-1 may be applied to modulate the pre-provisioning of a content, e.g., Movie Y, that is estimated to become popular in the Ashville service area. As the historical video asset delivery pattern 122-1 has established that only 4% of the content delivered in that service area comprises 1080p content at 8-12 Mbps, an example delivery rule may be such that 1080p representations of a content are excluded. Likewise, suitable thresholds may be established for the audio and subtitle asset components based on their respective likelihood estimates. Upon applying such delivery rules, it can be seen that the pre-provisioned ABR asset package 412 relative to Movie Y for the Ashville node 108-1 will include a video asset component 414-1 comprising only 720p and 480p representations of the content (encoded at, for example, 3/5 Mbs and 2/1 Mbs, respectively), an audio asset component 414-2 comprising only English 2.0 representations and a subtitle asset component 414-3 comprising only English language subtitles of Movie Y.

Accordingly, instead of pre-provisioning all the adaptation sets of an ABR asset package relative to a particular content that has been determined to be popular at certain nodes, the embodiments set forth herein provide finer-grain pre-provisioning of the ABR assets, resulting in more efficient deployment of network resources. Not only are the operator bandwidth costs minimized (since the network operators no longer have to transmit assets, i.e., files, that are unlikely to be used, regardless of how popular a particular content is) but a higher quality of service may also be provided to the end users. Furthermore, although the example pre-provisioning modulations described above are illustrative of application of asset trend-based delivery rules, similar pre-provisioning modulations may be equally achieved on the basis of network condition-based delivery rules, mutatis mutandis.

In a further example scenario, a DNMC system may be made aware of language preferences in the area serviced by each of the CDN edge nodes, as such awareness can be informed by historical trends within the CDN itself (e.g., users in a particular service area always or most often watch the Spanish language version), or based on wider trends supplied from third parties (e.g., the particular service area has a large Spanish speaking population) if the edge node has no historical data yet. Should a particular piece of content become popular in an area serviced by that edge node, the system only pre-populates the popular audio or subtitle data (which may even be different languages), rather than all audio or subtitle options normally included with each piece of content as part of the entire ABR asset package. Should a user want access to a language other than the prevailing one (i.e., outside the filtered pre-provisioned assets), the audio/subtitle data can be sent over in the normal fashion, on demand. In a still further example, the DNMC system may be made aware of historical network conditions for each of its edge servers. Should a particular edge server experience or exhibit consistently below average edge server conditions (as may be defined for a suitable performance metric), the DNMC system is made aware of such a condition. If a particular piece of content become popular in an area serviced by that edge node, the system only pre-populates lower bitrate content, as the higher bitrates are less likely to be used (and/or less likely to be downloaded). If the network conditions improve and atypical bitrates (outside the filtered pre-provisioned assets) are requested by the subscribers, such bitrates can be sent over in the normal fashion, on demand.

Figure 5A:
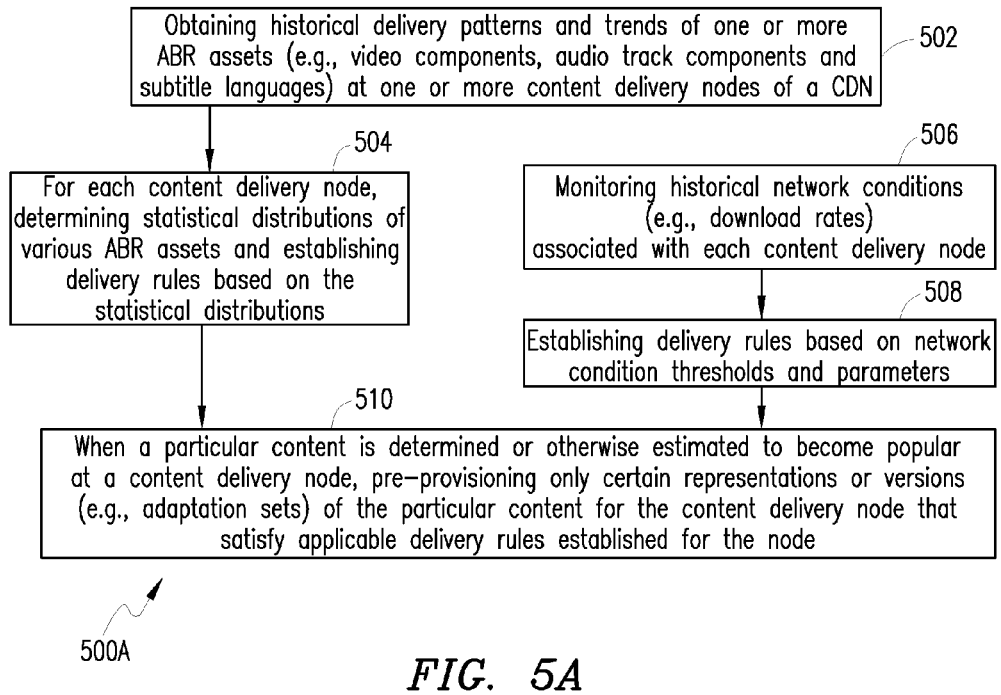
FIGS. 5A and 5B depict flowcharts with blocks relative to various steps and acts that may take place according to one or more embodiments of the present patent application.
Figure 5B:
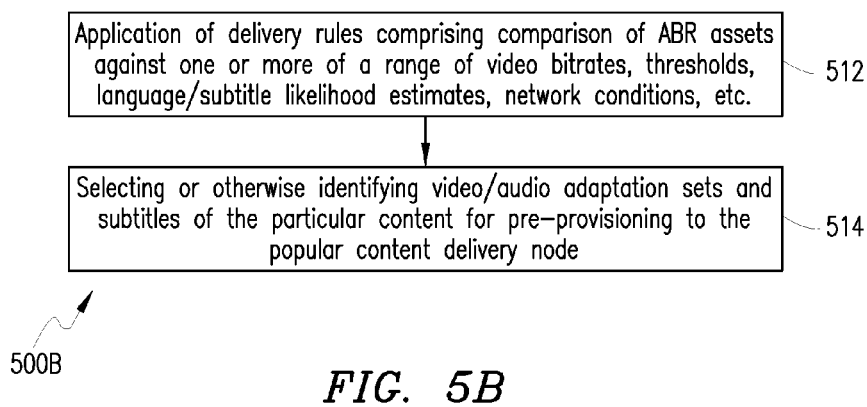

Turning now to FIGS. 5A and 5B, depicted therein are flowcharts with blocks relative to various steps and acts that may take place according to one or more embodiments of the present patent application for modulating pre-provisioning of ABR assets. Flowchart 500A is representative of a collection of processes that may be practiced either independently or in one or more combinations. In one example process, blocks 502, 504 and 510 illustrate an application of asset trend-based delivery rules with respect to pre-provisioning of popular content. In another example process, blocks 506, 508 and 510 illustrate an application of network condition-based delivery rules with respect to pre-provisioning. In a still further example process, blocks 502-510 may be combined in a number of ways where both asset-based delivery rules as well as network condition-based delivery rules may be applied for purposes of pre-provisioning policy modulation.

At block 502, historical delivery patterns and trends of one or more ABR assets may be obtained for one or more content delivery nodes of a CDN, for example, over a period of time such as a configurable moving/sliding time window. For each content delivery node, appropriate statistical distributions of the ABR assets may be determined, e.g., percentage distributions, likelihood estimates, multi-level ranking distributions, etc., over the relevant sample time base. Based on the ABR distributions, one or more delivery rules may be established or otherwise determined, which may be provided as part of an adaptive learning process, e.g., a knowledge-based or rules-based expert system (block 504). When a particular content is determined or otherwise estimated to become popular at different nodes in the CDN, only certain representations or adaptation sets of the particular content's video/audio/subtitle components that satisfy or otherwise meet the delivery rules may be pre-provisioned for delivery with respect to the nodes where the content has been determined to be popular (block 510).

Alternatively or additionally, historical network conditions (e.g., download rates, bandwidth usage, etc.) associated with respective content delivery nodes of the CDN may be monitored (block 506), which may then be used for determining suitable delivery rules. Again, such delivery rules may be static/deterministic or varied responsive to pre-configured control inputs from CDN management nodes (i.e., self-adaptive learning). Accordingly, the network condition-based rules may be established in a number of ways, depending on a specific implementation (block 508). As with the asset trend-based delivery rules, the network condition-based delivery rules may be used for filtering only certain adaptation sets of popular content for pre-provisioning (block 510).

Additional steps or acts relative to block 510 are illustrated as a separate flowchart 500B in FIG. 5B. At block 512, an application of the delivery rules may comprise comparisons of ABR assets against a range of video bitrates, thresholds, language/subtitle likelihood estimates, network connection performance/conditions, etc., as well as other metrics relating thereto. Responsive to the comparisons, video/audio adaptation sets and subtitles of a particular content may be selected or otherwise identified for pre-provisioning as set forth at block 514.

Figure 6:
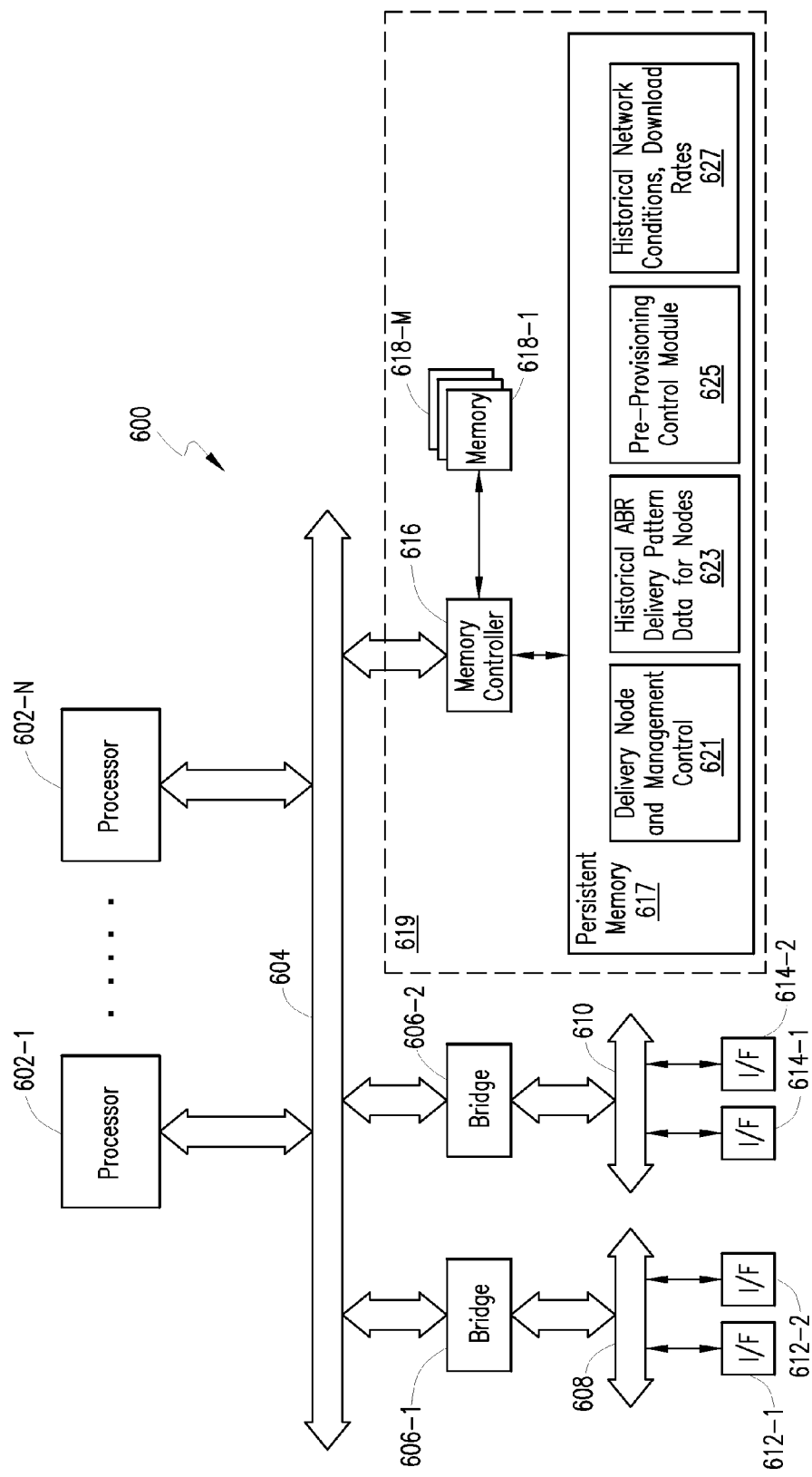
FIG. 6 depicts a block diagram of a computer system adapted to operate as a management node according to an embodiment of the present patent application.

FIG. 6 depicts a block diagram of a computer-implemented data processing system adapted to operate as a management node 600 according to an embodiment of the present patent application. Taking reference to FIGS. 4 and 6, the management node 600 may be configured as an example implementation of DNMC system 112 that may inter-operate with one or more CDN management systems such as a bandwidth allocation/scheduling system, a distribution pipe policy management and optimization system, a content policy and QoS management system, or a request rerouting/redirecting system, or any combination thereof, in addition to the popularity policy management system 402 associated with CDN 400 as well as the CDN nodes. One or more processors or processor boards 602-1 to 602-N coupled to a bus structure 464 provide for the overall control of the node 600, including executing one or more functionalities set forth in the present patent disclosure. Bus 604 may be coupled to one or more bus bridges or bus controllers 606-1, 606-2 for extending to or coupling to additional or peripheral buses 608, 610, which in turn may support a plurality of interfaces (I/F). By way of example, one or more of such interfaces 612-1, 612-2 may effectuate interfacing with various CDN nodes such as the national server node(s) 102, regional server nodes 104-1 to 104-3, and edge server nodes, 106-1 to 106-N; 108-1 to 108-M; 110-1 to 110-K. Additional interfaces 614-1, 614-2 may effectuate interfaces to one or more CDN management systems mentioned above.

A memory subsystem 619 provided with the management node 600 may include one or more memory controllers 616 for controlling memory operations relative to a plurality of memory modules 618-1 to 618-M as well as nonvolatile memory modules such as persistent memory module 617. Program instructions or logic, which may be organized and/or executed as one or more software processes, modules, blocks, routines, threads, etc. may be stored in or uploaded/downloaded into the persistent memory 617 for effectuating one or more embodiments of the present disclosure. For example, a delivery node and management control module 621 may be configured to effectuate or otherwise establish delivery rules based on historical ABR asset delivery trends and/or historical network connection conditions, which may be arranged in a node-by-node basis and stored in non-volatile databases 623, 627, respectively. In one implementation, the delivery rules may be established pursuant to statistical and mathematical modeling techniques involving, e.g., cluster analysis, multivariate analysis, principal component analysis, factor analysis, correlation analysis, adaptive neural networks, regression analysis, etc. to not only learn but also forecast ABR asset distributions on a node-by-node basis. As pointed out previously, the delivery rules may be distributed to appropriate CDN nodes (e.g., the national server 102) for modulating content pre-provisioning policies. Alternatively or additionally, yet another module 625 may be provided for applying the delivery rules in conjunction with content pre-provisioning policies as determined by the popularity policy management system 402, whereby modulated pre-provisioning policies may be provided to the CDN nodes. In a still further variation, the delivery rules may also be applied in conjunction with a request redirector system that is operative to redirect subscribers' requests to appropriate edge server nodes based on popularity, network bandwidth conditions, etc. for purposes of the present patent disclosure.

Figure 7:
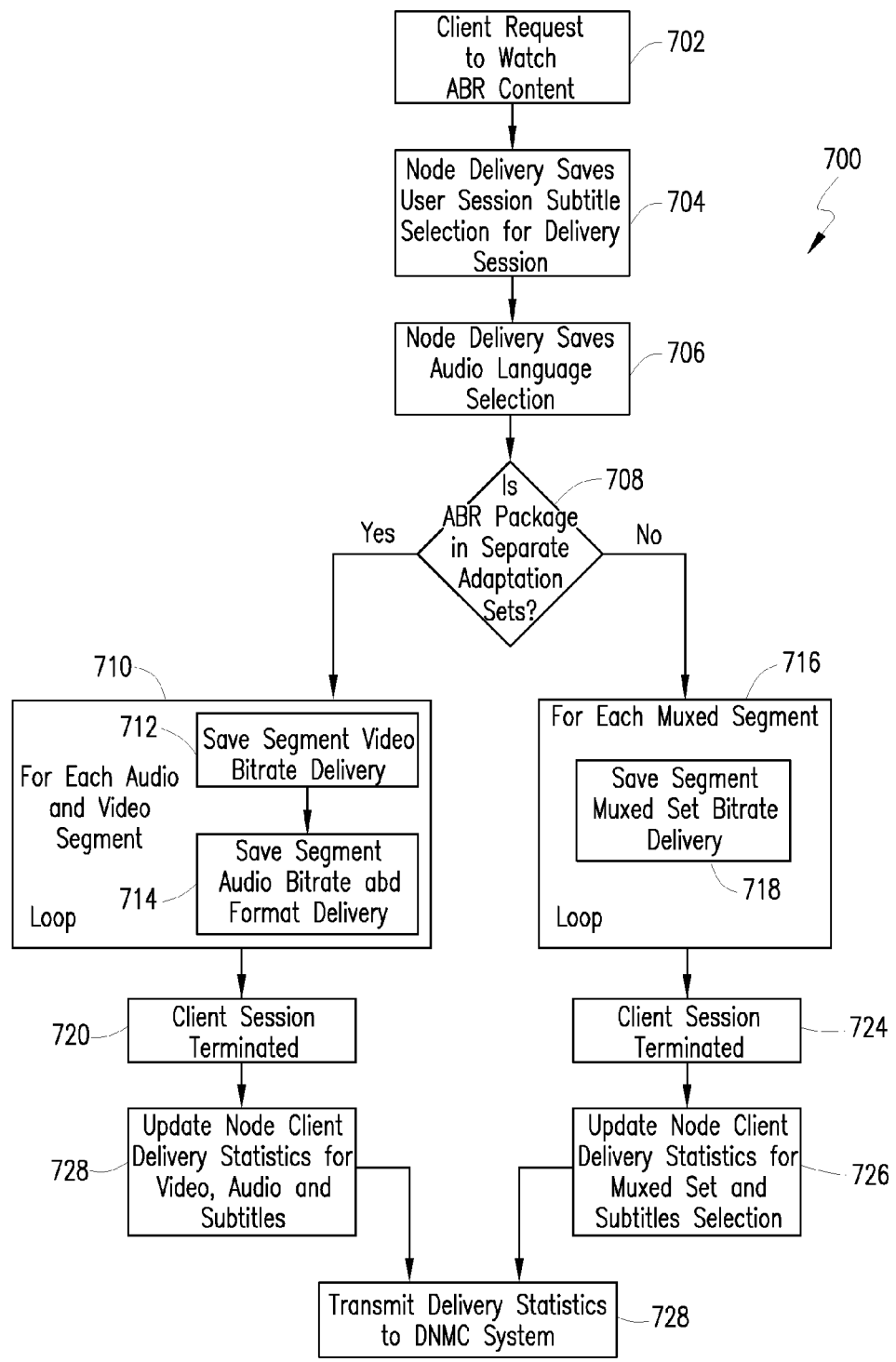
FIG. 7 is a flowchart with blocks relative to various steps and acts that may take place for monitoring historical delivery trends of ABR assets according to an embodiment of the present patent application.

FIG. 7 is a flowchart of an example process 700 with blocks relative to various steps and acts that may take place for monitoring historical delivery trends of ABR assets according to an embodiment of the present patent application. When a client requests to watch ABR content (block 702), appropriate data such as subtitle/language selection, etc. may be saved for the delivery session (blocks 704, 706). Depending on whether the ABR content is in separate adaptation sets or in interleaved content stream (i.e., multiplexed or muxed content stream provided in certain legacy streaming implementations) as set forth in decision block 708, further data relative to the delivery session may be stored, saved or otherwise monitored. For the content in separate adaptation sets, a loop sub-process 710 may be effectuated with respect to each audio and video segment of the ABR asset package, wherein segment video bitrate(s), audio bitrate(s) and delivery format (e.g., audio formats such as MP3, AAC, AAC+, eAAC+, FLAG WMA, WAV, AMR, OGG, DTS, AC3, LPCM and MIDI as well as video formats such as, e.g., MPEG4, H.263, H.264, DivX, XviD, WMV, AVI, 3GO, Flash Video), may be stored, as set forth at blocks 712, 714. For muxed content, a loop sub-process 716 is operative to store the segment bitrate(s) for each interleaved segment (block 718). Thereafter, when the client delivery session is terminated (block 720, 724), suitable data updating procedures may take place relative to the delivery statistics of video/audio/subtitle assets (block 728) or the muxed set bitrate(s) and subtitle selection (block 726). In one implementation, the foregoing sub-processes 710, 716 and subsequent updating procedures may take place relative to each content delivery node of a CDN over a respective period of time, which nodes may be configured to provide (block 728) the delivery statistics to a management node such as DNMC system 102 shown in FIG. 1, for example. Further, transmission of delivery statistics between the DNMC system and CDN nodes may be effectuated by means of request/response query mechanisms, push mechanisms, pull mechanisms, in addition being triggered based on timers, user/network settings, and other conditionalities.

Figure 8:
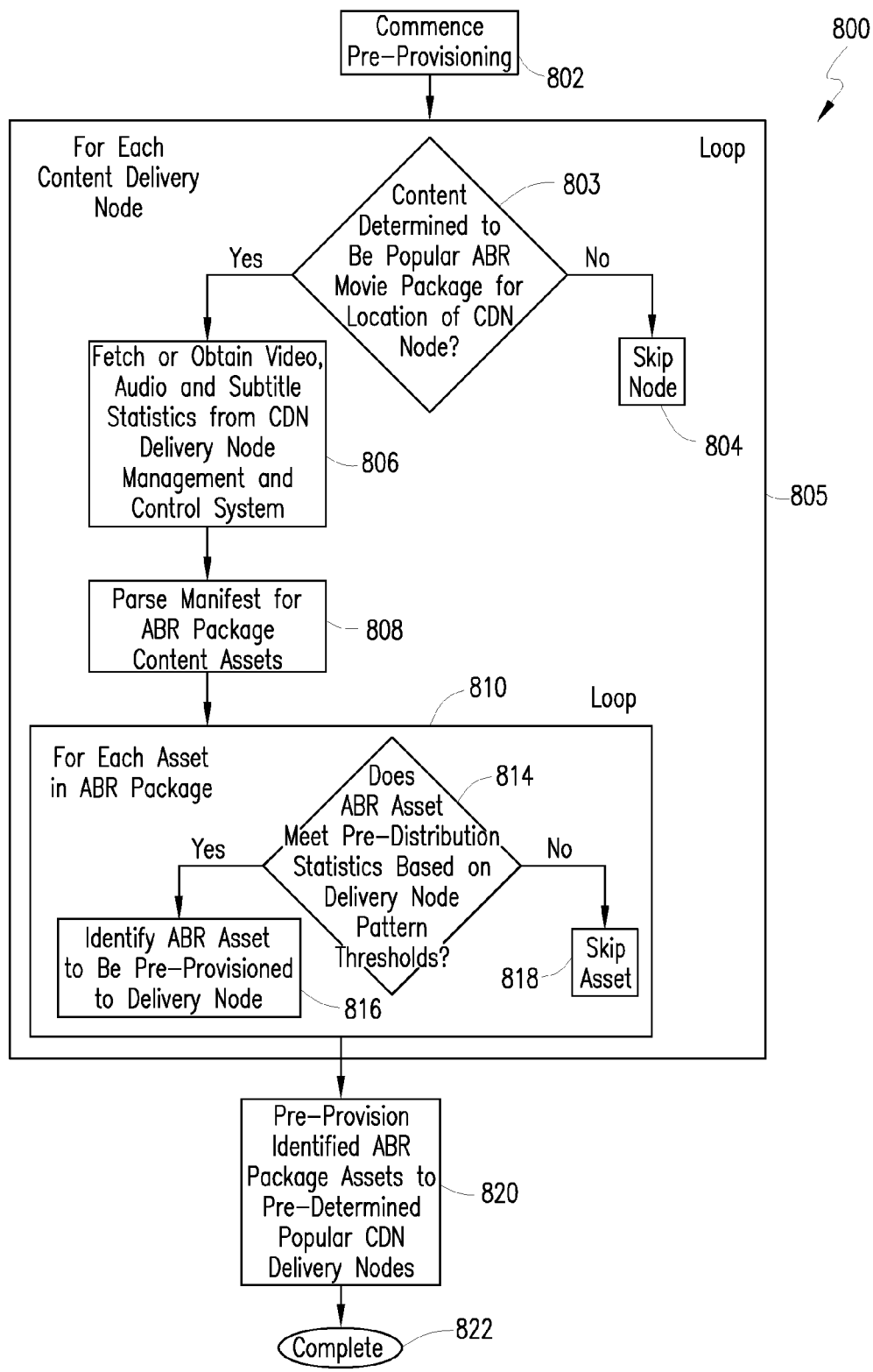
FIG. 8 is a flowchart with blocks relative to various steps and acts that may take place for pre-provisioning of content based on delivery rules according to an embodiment of the present patent application.

FIG. 8 is a flowchart an example process 800 with blocks relative to various steps and acts that may take place for modulating pre-provisioning policies of content based on delivery rules according to an embodiment of the present patent application. When pre-provisioning of content in a CDN is commenced (block 802), a loop sub-process 805 may be effectuated with respect to each content delivery node, which is initiated at a decision block 803 by determining whether a particular content is estimated or other determined to be popular in a service location of the delivery node. If the content is not determined to be popular in a delivery node's area, that delivery node may be skipped (block 804) and the content's popularity relative to a next delivery node may be analyzed. If the content is determined to be popular with respect to a specific content delivery node, appropriate historical video/audio/subtitle delivery statistics and associated asset delivery rules for that node may be obtained and/or utilized (block 806). The particular popular content's manifest may be analyzed relative to the ABR package assets available, including the corresponding adaptation sets if applicable (block 808). For each asset in the ABR package, a loop sub-process 810 is effectuated that commences with a determination as to whether the ABR asset (and its adaptation set(s)) meets the corresponding delivery rule(s) based on the distribution statistics (decision block 814). If so, that ABR asset (and its adaptation set(s)) may be identified for pre-provisioning (block 816) with respect to the specific content delivery node identified in decision block 803. Otherwise, the ABR asset is skipped and the next asset in the ABR package of the particular popular content is analyzed (block 818). After applying the delivery rules to all the ABR assets relative to each delivery node where the particular content has been determined to be popular, appropriate ABR assets (and corresponding adaptation set(s)) are pre-provisioned for the "popular" nodes (block 820), whereupon the process is completed (block 822). As illustrated in FIGS. 1 and 4, not all popular nodes may be pre-provisioned with the same ABR assets/adaptation sets because of the varying historical delivery trends, network conditions, and the like.

Figure 9:
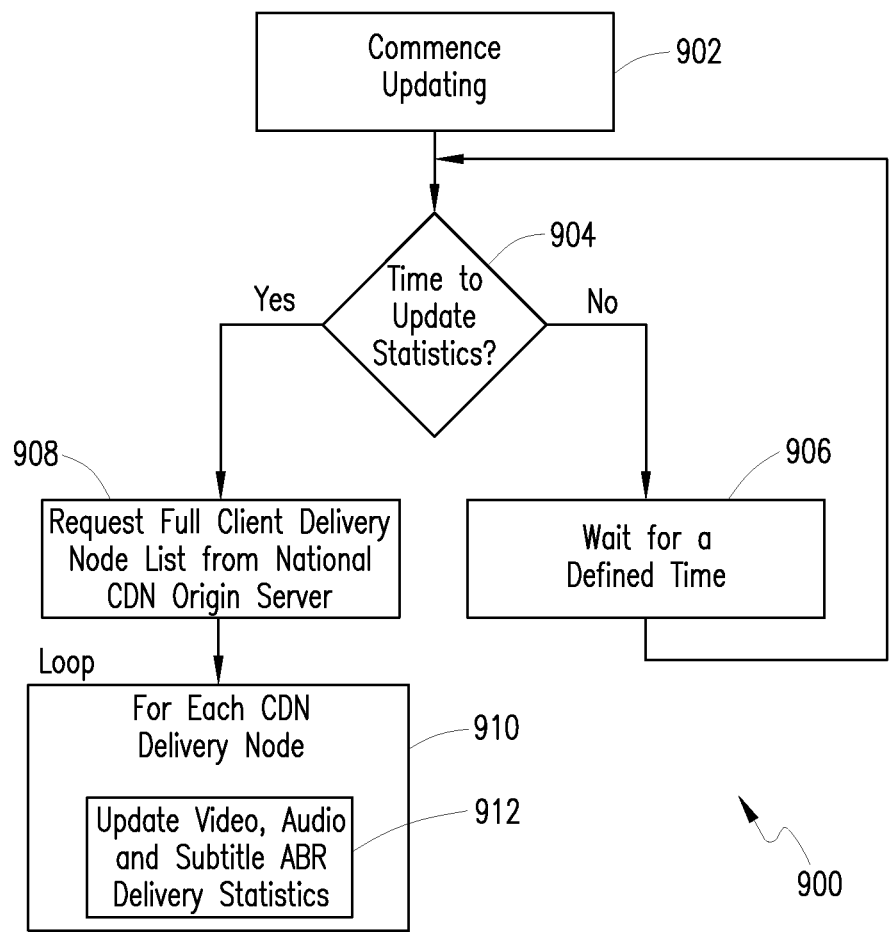
FIG. 9 is a flowchart with blocks relative to various steps and acts that may take place for updating historical delivery trend data for one or more content delivery nodes of a CDN according to an embodiment of the present patent application.

FIG. 9 is a flowchart of an example process 900 with blocks relative to various steps and acts that may take place for updating historical delivery trends and/or network conditions data for one or more content delivery nodes of a CDN according to an embodiment of the present patent application. Pursuant to invoking an updating routine (block 902), a timer-related determination may be made as to whether it is appropriate to update trend/conditions statistics in the CDN (decision block 904). If so, a complete list of content delivery nodes may be obtained (e.g., by the DNMC system) from a national origin server of the CDN (block 908). For each delivery node of the list, a loop sub-process 910 may be effectuated for obtaining video/audio/subtitle delivery statistics and updating a database record or storage associated with the node based thereon (block 912). Additionally or alternatively, appropriate network conditions may also be monitored on a node-by-node basis. If the timer-related (or, other trigger-based) determination indicates that it is not appropriate to update the statistics yet, the updating process 900 may wait for a pre-configured amount of time to elapse (block 906). It should be appreciated that although a single timing determination is illustrated (i.e., decision block 904) with respect updating the statistics for all CDN nodes, multiple timing determinations and/or other trigger-based thresholds may also be implemented for initiating separate updating processes corresponding to the respective CDN nodes.

In addition to facilitating modulation of content pre-provisioning policies in a CDN, the historical delivery trends and network conditions described hereinabove may also be utilized for optimizing defragmentation of content in the CDN in a further aspect. As pointed out previously, when clients access ABR content via a CDN, it is possible that servers at the edge may become fragmented because of the inherent features of adaptive streaming architecture. Typically, edge server nodes of the CDN may serve one or many individual segment files of a particular ABR asset package to a client and when the client requests content from a second edge server (e.g., due to redirection), both the first edge server and the second edge server may end up holding an incomplete collection of the segment files referenced by the associated manifest.

When edge servers do not hold a copy of a requested segment file, they may be required to retrieve or pull the requested segment file from a parent node such as a regional server. While this generally causes the parent node to hold a complete copy of the requested segment files, there is no guarantee that a complete segment collection referenced in a manifest will reside on the parent node for all advertised bitrates. Accordingly, fragmentation may occur when clients request some, but not all, of the segment files for a manifest from the same edge server resulting in an incomplete copy of the entire manifest segment collection. Clients changing bitrates within an adaptive streaming architecture can compound this fragmentation on an edge server even further. As a solution, particular embodiments described in the commonly assigned patent application entitled "DEFRAGMENTATION OF ADAPTIVE STREAMING SEGMENT FILES IN A CONTENT DELIVERY NETWORK", application Ser. No. 13/923,005, filed Jun. 20, 2013, in the name(s) of Christopher Phillips et al., incorporated by reference hereinabove, provide a "defragmentation" system and method within a CDN whereby edge servers are ensured to hold a complete copy of the entire segment collection referenced in a manifest. In a further enhancement, embodiments of the present disclosure described below provide an optimized defragmentation system and method wherein the fragmented content at edge server nodes is replenished based on historical delivery trends and/or network conditions associated with the nodes. Furthermore, the disclosed embodiments may be controlled to occur at times of low network utilization such that conditions of bandwidth congestion may be avoided or otherwise ameliorated.

Figure 10A:
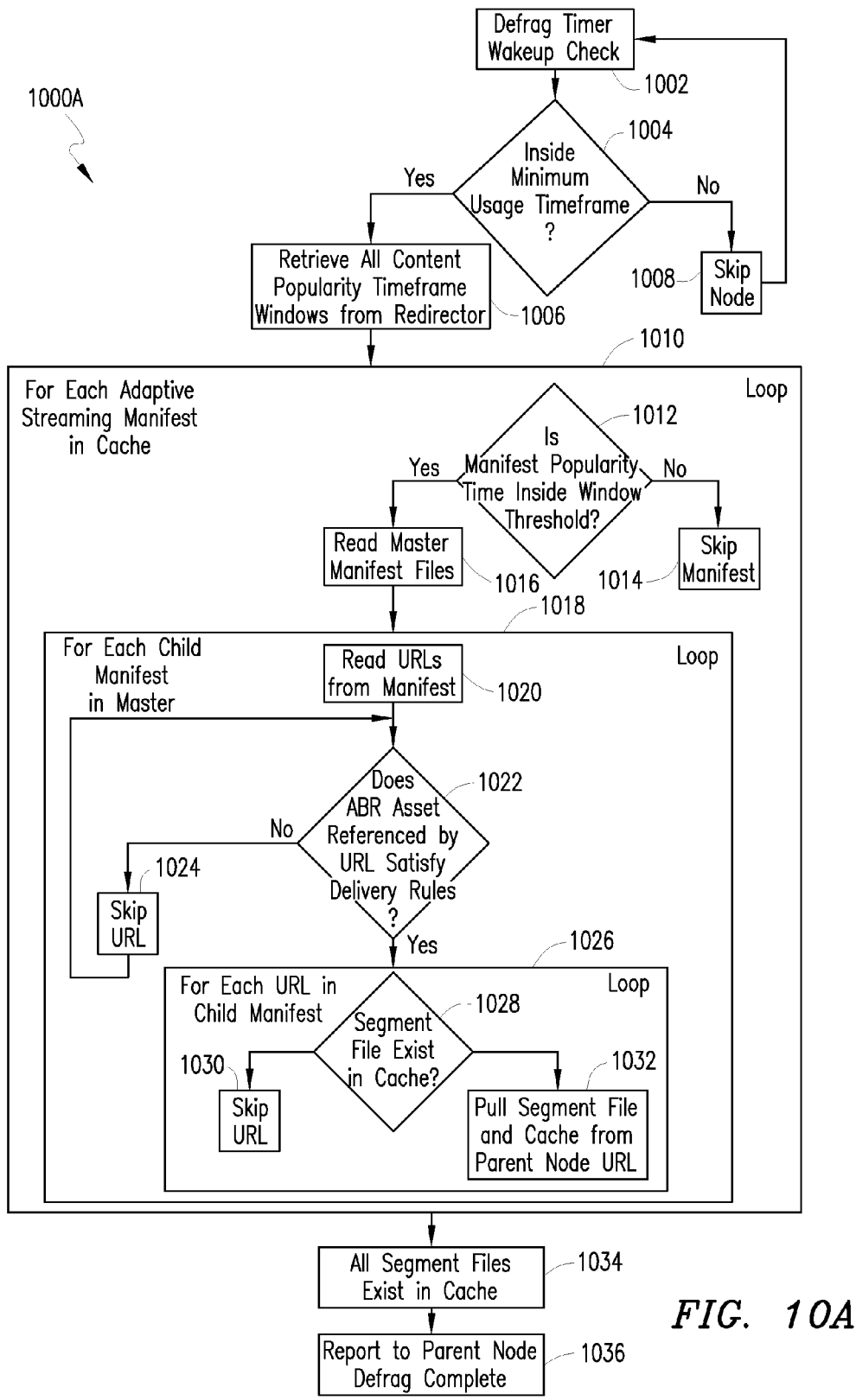
FIGS. 10A-10C depict flowcharts with blocks relative to various steps and acts that may take place for defragmentation of media segments in a content delivery node of according to one or more embodiments of the present patent application.
Figure 10B:
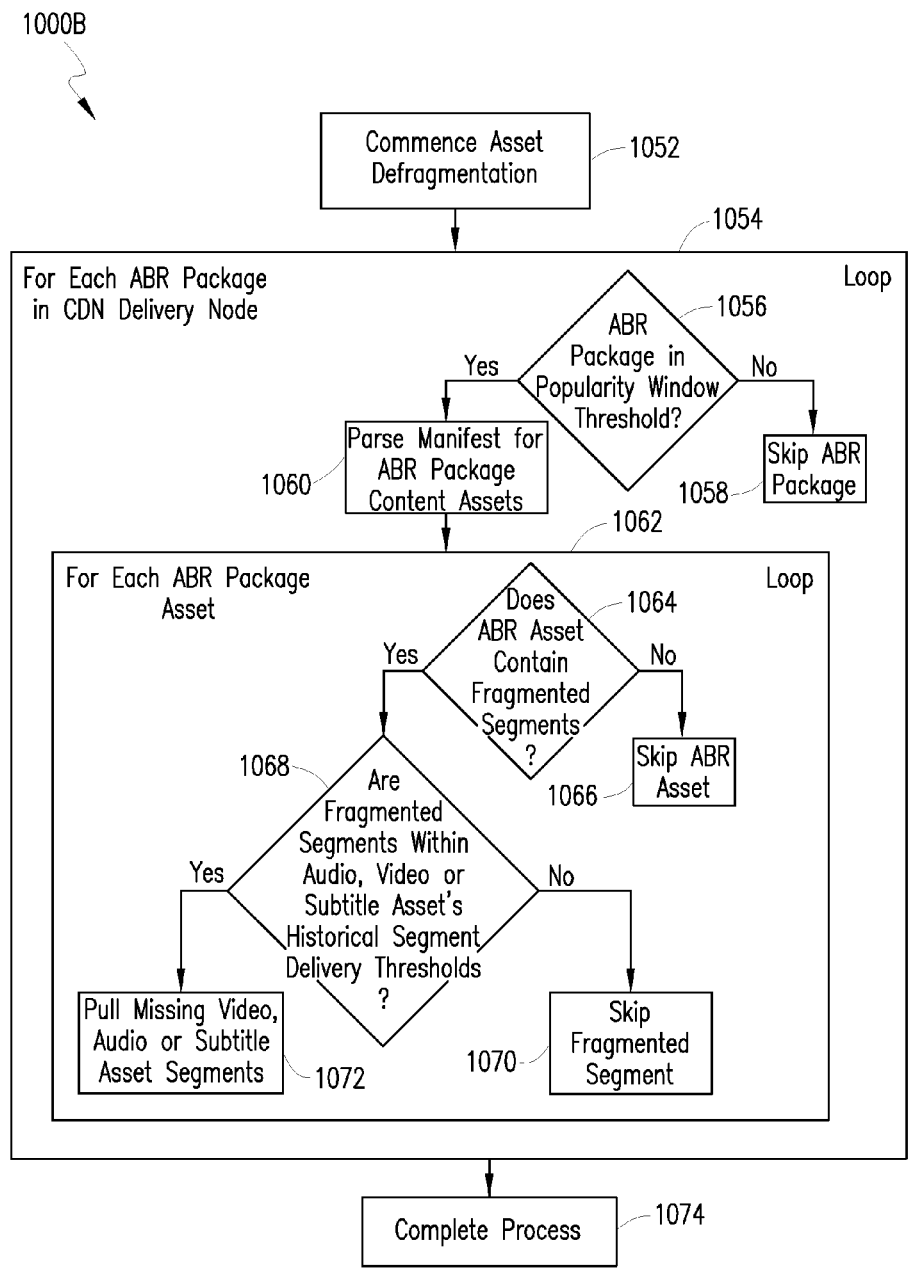
Figure 10C:
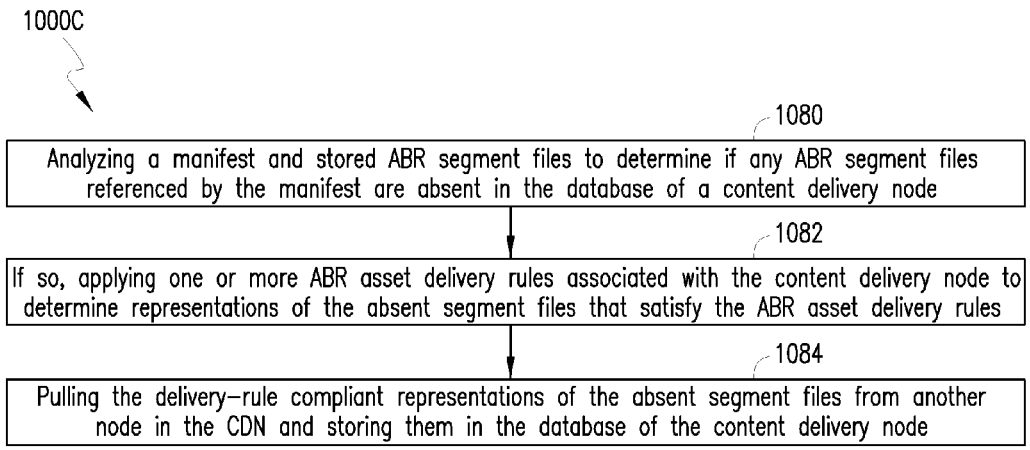

FIGS. 10A-10C depict flowcharts with blocks relative to various steps and acts that may take place for optimizing defragmentation of media segments in a content delivery node of according to one or more embodiments of the present patent application. Turning first to FIG. 10C, an embodiment of optimized defragmentation process 1000C may take place at a CDN node with respect to a particular content. At block 1080, the CDN node is configured to analyze the content's manifest as well as the ABR segment files that are stored in a database cache of the CDN node in order to determine if any segment files referenced by/in the manifest are absent thereat. If so, one or more ABR asset delivery rules associated with the CDN node may be applied to determine representations or adaptation sets of the absent/missing segment files that satisfy the delivery rules (block 1082). Responsive thereto, only compliant representations/adaptation sets of the absent segments are pulled or retrieved from another CDN node (e.g., another edge server node or a parent node such as a regional server node), which are then stored locally in the database cache of the CDN node (block 1084).

FIG. 10A depicts a flowchart of an optimized defragmentation process 1000A in further detail, which may be performed by a child node or edge node such as edge server nodes 106-N, 108-1 of CDN 100. Similar to the flowcharts described hereinabove, blocks enclosing a portion of steps of the process indicate a loop sub-process wherein the enclosed operations may be iteratively/repeatedly performed until the list of entities for which the loop is effectuated is exhausted. In one implementation, each node within the CDN may determine at various time intervals whether a current time falls within a period that is characterized by the node's low network utilization (e.g., during late night), which may be configured as the node's Minimum Usage Timeframe parameter. Nodes that do not provide self-calculating timeframes may send a request to a parent node, a redirector server, or another server to determine its Minimum Usage Timeframe. Thus, at block 1002, the edge node checks a defragmentation wakeup timer, which causes the edge node to determine at decision block 1004 whether the current time is within the period of minimum usage of network resources within the CDN. The edge node may self-calculate the period of minimum usage of network resources if able, and if not able, the edge node receives information identifying the period of minimum usage of network resources within the CDN from its parent node, the redirector server, or another server in the CDN. If the current time is not within the period of minimum usage of network resources within the CDN, the process moves to block 1008 where defragmentation is skipped for that particular edge node, with control returning to block 1002. When it is determined at block 1004 that the current time is within the period of minimum usage of network resources within the CDN, the process moves to block 1006 where the edge node retrieves all content popularity timeframe windows, e.g., from the redirector server operating in conjunction with a popularity policy management server. Process 1000A thereafter enters a loop sub-process 1010 that encompasses a collection of actions performed for each adaptive streaming manifest associated with segment files stored in the edge node's local cache memory. At block 1012 of loop 1010, the edge node determines whether the current time is within the popularity time window threshold for a particular manifest/package being analyzed. It should be appreciated that such a determination may be made in order to ensure the complete piece of electronic content is available (and potentially within a licensing window) when clients are likely to request the segment files. If the current time is not within the popularity time window threshold, the process moves to block 1014 where the edge node skips that particular manifest/package. When it is determined at block 1012 that the current time is within the popularity time window threshold for the particular package being analyzed, the process moves to block 1016 where the edge node reads the master manifest file(s) associated therewith. The process thereafter enters another loop sub-process 1018 that encompasses a series of actions performed for each child manifest in the master manifest. At block 1020, the edge node reads the URLs of the segment files from a particular child manifest (such as, e.g., the URLs illustrated in MPD model 300 shown in FIG. 3). A determination is made as to whether the ABR asset segment referenced by the URL satisfies the applicable delivery rules associated with the node (decision block 1022). If not, the URL is skipped and the next URL referenced in the child manifest is analyzed. For the URLs that refer to ABR asset segments complying with applicable delivery rules, yet another loop sub-process 1026 is entered for determining if the respective asset segments exist in the edge node's cache memory (decision block 1028). If so, the edge node skips the URL for that segment file at block 1030 and moves to the next segment file. This sub-loop process continues for each of the segment files referenced by the child manifest, and when a referenced segment file is determined to be absent from the edge node's local cache memory, the process moves to block 1032 where the edge node utilizes the URL of the absent segment file to pull the absent segment file from another CDN node such as the edge node's parent node or another edge node. Subsequently, the edge node caches the segment file pulled from the other CDN node. When all the loops have been performed for each adaptive streaming manifest in cache, for each child manifest in the master manifest, and for each URL in each child manifest, all segment files should exist in the edge node's local cache memory. Upon verification that all segment files for all manifests exist in the edge node's local cache memory at block 1034, the process moves to block 1036 where the edge node reports to its parent node that defragmentation is complete. It will be apparent to one skilled in the art that the sequence of the loops and sub-loops illustrated in FIG. 10A may be interchanged in some implementations, and some of the operations from one loop may be moved to a sub-loop within.

FIG. 10B depicts a flowchart of another embodiment of an optimized defragmentation process 1000B in further detail, which may be performed by a content delivery node of the CDN. Similar to the flowcharts described hereinabove, blocks enclosing a portion of steps of the process indicate a loop sub-process wherein the enclosed actions may be iteratively/repeatedly performed until the list of entities for which the loop is effectuated is exhausted. When asset defragmentation is commenced in the CDN, e.g., responsive to a defragmentation timer mechanism or some other trigger-based mechanism (block 1052), a loop sub-process 1054 may be effectuated with respect to each ABR package within the content delivery node, which is initiated at a decision block 1056 by determining whether a particular ABR package is within a popularity time window or threshold. If not, the particular ABR package is skipped and a next ABR package is analyzed (block 1058). If the ABR package is within the popularity time window, the manifest of the ABR package is analyzed (block 1060), whereupon a loop sub-process 1062 is entered that is performed for each asset component of the ABR package. A determination is made as to whether the asset contains fragmented segments (block 1064). If so, a further determination is made as to whether the fragmented segments are within the historical audio/video/subtitle delivery trend rules and thresholds (decision block 1068). If the missing audio, video, and/or subtitle asset segments are within the historical delivery trends/thresholds, such segments may be pulled from a regional or national server node or another edge server node (block 1072). If the ABR asset does not contain any fragmented segments, the asset is skipped and a next asset of the ABR package is analyzed (block 1066). Further, if the fragmented segments are not compliant with the applied delivery rules, they are skipped from segment retrieval (block 1070). When all the loops have been performed for each delivery node, each ABR package within a delivery node, etc., the optimized defragmentation process 1000B is completed (block 1074).

With respect to the optimized defragmentation embodiments described hereinabove, it should be appreciated that the historical trend-based delivery rules and/or network condition-based delivery rules may be provided by the DNMC system to each CDN node as it commences its defragmentation process relative to the contents cached thereat. In another variation, because each CDN node may also be configured to maintain its own trends (at least for a short term), there would be no need to retrieve the trend data from a management node in such a scenario. In a still further variation, locally maintained short-term based trends as well as long-term trends maintained at the DNMC system may be applied for purposes of determining which of the missing segments should be pulled from another node in the CDN. Additionally, the foregoing optimized defragmentation embodiments may be practiced with respect to parent nodes as well as child nodes of a CDN.

Figure 11:
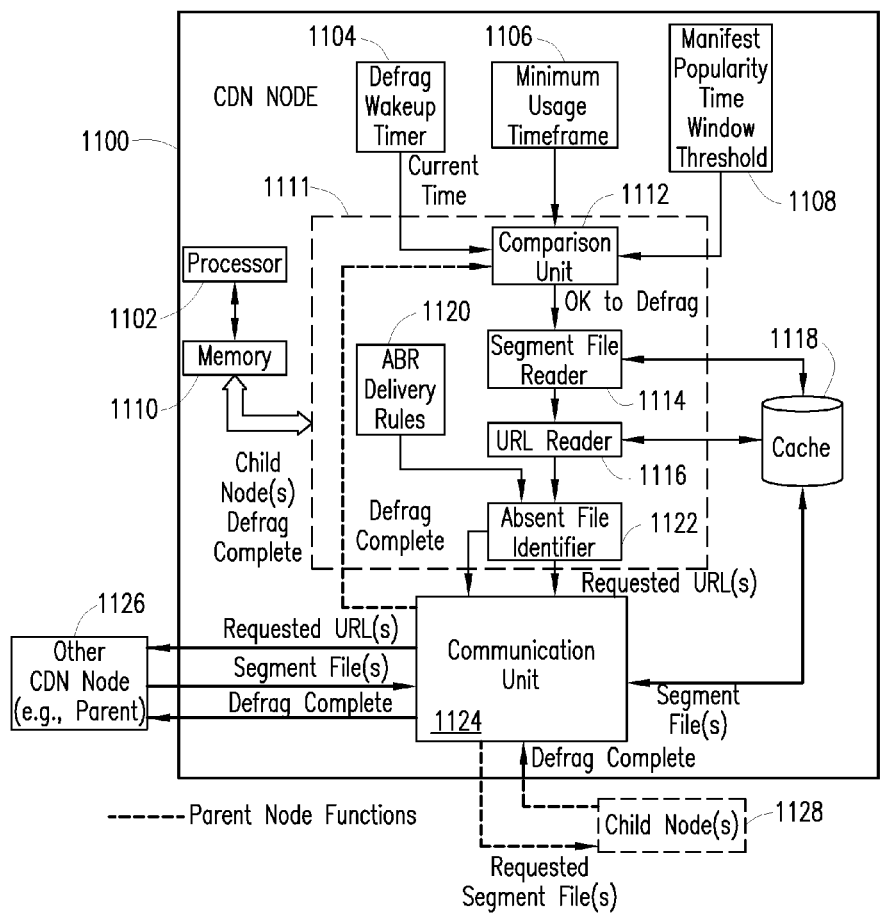
FIG. 11 depicts a block diagram of a computer system adapted to operate as a content delivery node that may be configured to effectuate optimized content defragmentation according to an embodiment of the present patent application.

FIG. 11 depicts a block diagram of a computer-implemented data processing system adapted to operate as a content delivery node 1100 that may be configured to effectuate optimized content defragmentation according to an embodiment of the present patent application. The functions of the CDN node 1100 may be controlled, for example, by one or more processors 1102 executing computer program instructions stored on a memory 1110 including a persistent module 1111. A defragmentation wakeup timer 1104 provides the current time to a comparison unit 1112, which compares the current time with a Minimum Usage Timeframe parameter 1106. If the current time is within the Minimum Usage Timeframe, the comparison unit 1112 further compares the current time with the manifest popularity time window/threshold 1108. If the current time is within the manifest popularity time window threshold, the comparison unit 1112 notifies a segment file reader 1114 that it is appropriate to start the defragmentation process. The segment file reader 1114 is operative to read the ABR asset segment files from a local database cache 1118. A URL reader 1116 is operative to read the URLs of each of the segment files referenced by the associated manifest and provide them to an absent file identifier 1122. The absent file identifier 1122 is operative to identify one or more referenced segment files that comply with applicable ABR asset delivery rules 1120 but are absent from the local cache memory 1118. URL information relative to the compliant missing segments files is provided to a communication unit 1124 that is operative to send one or more requests for the segment files by sending the requested URL(s) to another CDN node 1126, which may be, for example, a parent node. In response, the other CDN node 1126 returns the requested segment file(s) to the communication unit 1124, which sends them to the cache 1118 for storage. Subsequently, the segment file reader 1114 and file identifier 1122 are operative to determine that all segment files referenced by the associated manifest document now exist in the cache 1118. The file identifier 1122 may thereafter notify the communication unit 1124 that the defragmentation process is complete, which in turn may notify the other CDN node 1126 that the defragmentation process is complete. It should be appreciated that dashed lines in FIG. 11 indicate additional functionality when the CDN node 1100 is also a parent node. As set forth in additional detail in the commonly assigned patent application (application Ser. No. 13/923,005, filed Jun. 20, 2013) incorporated by reference hereinabove, the parent node functionality may involve determining whether all of its child node(s) 1128 have reported that their defragmentation process is complete. Once all the child node(s) have reported that their defragmentation is complete, the comparison unit 1112 may continue by determining whether the current time is within the manifest popularity time window threshold 1108. If so, the defragmentation process for the parent node may be initiated.

Figure 12:
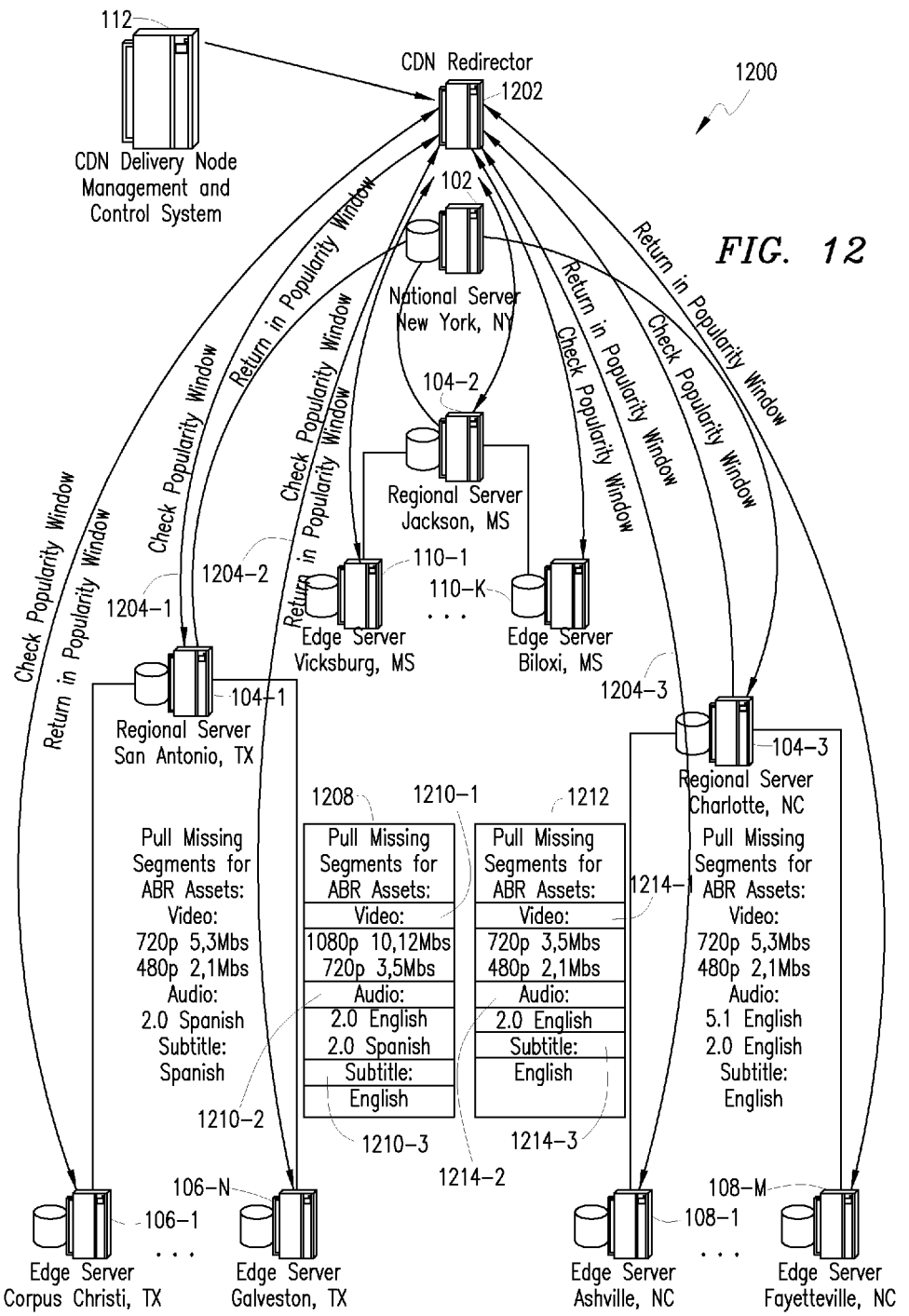
FIG. 12 depicts an example content delivery network wherein fragmented content is replenished at a content delivery node based on historical delivery trends according to an embodiment of the present patent application.

FIG. 12 depicts an example content delivery network 1200 wherein fragmented content is replenished at a content delivery node (e.g., edge server nodes 106-N, 108-1) based on historical delivery trends according to an embodiment of the present patent application. For purposes of illustration, CDN 1200 is identical to CDN 100 shown in FIG. 1 except that a CDN redirector node 1202 is shown to interface with DNMC system 112 for receiving suitable delivery rules as discussed hereinabove. Further, the CDN redirector node 1202 may also receive content popularity windows from a content popularity policy management node (not specifically shown) for distributing the data to the various nodes of CDN 1200, as illustrated by example request/response paths 1204-1, 1204-2 and 1204-3 relative to nodes 104-1, 106-N and 108-1, respectively. As described in detail in the foregoing sections with respect to FIGS. 10A-10C and 11, an edge server node is operative to apply the delivery rules in order to identify a subset of representations of the missing segments of a fragmented content file. By way of example, the Galveston edge server 106-N is operative to apply suitable delivery rules based on its ABR asset delivery pattern 116, whereby only certain representations of the missing segments that satisfy the rules may be retrieved from another CDN node, as shown by a missing segments identifier 1208 that comprises a video asset component 1210-1 (for pulling only 720p and 1080p representations of the content encoded at, for example, 3/5 Mbs and 10/12 Mbs, respectively), an audio asset component 1210-2 (for pulling only English 2.0 and Spanish 2.0 representations), and a subtitle asset component 1210-3 (for pulling only English language subtitles of the content).

In similar fashion, one or more delivery rules based on the learned ABR asset delivery pattern 120 associated with the Ashville edge server 108-1 may be applied to optimize the server's missing segment retrieval. Reference numeral 1212 refers to the Ashville server's missing segments identifier that illustrates a video asset component 1214-1 (for pulling only 720p and 480p representations of the content encoded at, for example, 3/5 Mbs and 2/1 Mbs, respectively), an audio asset component 1214-2 (for pulling only English 2.0 representations), and a subtitle asset component 1214-3 (for pulling only English language subtitles of the content).

One skilled in the art will recognize upon reference hereto that if an entire file becomes necessary (for example, additional languages are needed), the defragmentation system is aware of which files are already transferred to the edge of the network and only transfers those sections of the file which are additionally needed. Similarly, should an edge node decide to delete files due to memory constraints, the system will be aware of which fragments of the file are no longer needed (for example, due to the language(s) or bitrate(s) being no longer required).

Based upon the foregoing Detailed Description, it should be appreciated that the embodiments of the present disclosure can be advantageously implemented that allow CDNs to function more efficiently, by making available what is needed where it is needed before it is needed. In addition to savings in operator bandwidth costs, the disclosed embodiments also provide higher QoS levels with respect to end user experience.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Moreover, the acts, steps, functions, components or blocks illustrated in a particular flowchart may be inter-mixed or otherwise inter-arranged with the acts, steps, functions, components or blocks illustrated in another flowchart in order to effectuate additional variations, modifications and configurations with respect to one or more implementations of pre-provisioning policy modulation and/or optimized content defragmentation techniques, either in combination or separately, for purposes of the present patent disclosure. Finally, other blocks may be added/inserted between the blocks that are illustrated. Moreover, although some of the diagrams include arrows on communication paths to show a primary direction of communication, it is to be understood that communication may occur in the opposite direction relative to the depicted arrows.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method operative at a management node associated with a content delivery network (CDN) configured to deliver adaptive streaming content, the method for effectuating efficient usage of network resources of the CDN and comprising:
    obtaining historical delivery patterns of one or more adaptive bitrate (ABR) assets associated with one or more content delivery nodes of the CDN, wherein the historical delivery patterns corresponding to a particular content delivery node comprise distributions of the one or more ABR assets of various content files that are delivered from the particular content delivery node over a configurable time window to a plurality of subscribers served by the particular content delivery node;
    determining, for each content delivery node, one or more delivery rules based on the distributions of the ABR assets delivered over the configurable time window;
    obtaining a push policy for a particular content determined to become popular at a specific content delivery node, the push policy operating to facilitate pre-provisioning of the particular content at the specified content delivery node, and modulating the push policy to pre-provision only certain subsets of the one or more ABR assets of the particular content for delivery at the specific content delivery node based on the one or more delivery rules established for the specific content delivery node; and
    providing the modulated push policy to at least one of a central distribution node and a regional distribution node of the CDN for minimizing bandwidth cost for transmitting the particular content through the CDN with respect to servicing subscriber requests for the particular content at the specific content delivery node.

2. The method as recited in claim 1, wherein the ABR assets comprise at least one of video components, audio track components and one or more subtitle languages of the various content files delivered to the plurality of subscribers.

3. The method as recited in claim 2, wherein the historical delivery patterns are obtained for all the video components, all the audio track components, and all subtitle languages downloaded over the configurable time window at respective content delivery nodes of the CDN.

4. The method as recited in claim 3, wherein the one or more delivery rules for a respective content delivery node comprise at least one of a video delivery rule based on bit rates of video components downloaded from the respective content delivery node, an audio delivery rule based on audio language tracks downloaded from the respective content delivery node, and a subtitle delivery rule based on subtitle language selections downloaded from the respective content delivery node.

5. The method as recited in claim 1, wherein the particular content is estimated to become popular at a specific content delivery node based on at least one of revenue data, search trend data, subscriber demographic data, and social media data obtained for the particular content.

6. The method as recited in claim 1, wherein the content delivery nodes comprise one or more edge distribution nodes and one or more regional distribution nodes coupled to the central distribution node.

7. A management node operative with a content delivery network (CDN) configured to deliver adaptive streaming content, the management node adapted for effectuating efficient usage of network resources of the CDN and comprising:
    one or more processors;
    a database for storing historical delivery patterns of one or more adaptive bitrate (ABR) assets associated with one or more content delivery nodes of the CDN, wherein the historical delivery patterns corresponding to a particular content delivery node comprise distributions of the one or more ABR assets of various content files that are delivered from the particular content delivery node over a configurable time window to a plurality of subscribers served by the particular content delivery node;
    a delivery node management and control (DNMC) module embodied in a persistent memory coupled to the one or more processors, the DNMC module having instructions executable by the one or more processors and configured to determine, for each content delivery node, one or more delivery rules based on the distributions of the ABR assets delivered over the configurable time window; and
    a content pre-provisioning control module embodied in a persistent memory coupled to the one or more processors, the content pre-provisioning control module having instructions executable by the one or more processors and configured to:

obtain a push policy for a particular content determined to become popular at a specific content delivery node, the push policy operating to facilitate pre-provisioning of the particular content at the specified content delivery node, and modulate the push policy to pre-provision only certain subsets of the one or more ABR assets of the particular content for delivery at the specific content delivery node based on the one or more delivery rules established for the specific content delivery node; and provide the modulated push policy to at least one of a central distribution node and a regional distribution node of the CDN for minimizing bandwidth cost for transmitting the particular content through the CDN with respect to servicing subscriber requests for the particular content at the specific content delivery node.

8. The management node as recited in claim 7, wherein the ABR assets comprise at least one of video components, audio track components and one or more subtitle languages of the various content files delivered to the plurality of subscribers.

9. The management node as recited in claim 8, wherein the historical delivery patterns are obtained and stored in the database for all the video components, all the audio track components, and all subtitle languages downloaded over the configurable time window at respective content delivery nodes of the CDN.

10. The management node as recited in claim 9, wherein the DNMC module is operative to determine the one or more delivery rules for a respective content delivery node comprising at least one of a video delivery rule based on bit rates of video components downloaded from the respective content delivery node, an audio delivery rule based on audio language tracks downloaded from the respective content delivery node, and a subtitle delivery rule based on subtitle language selections downloaded from the respective content delivery node.

11. The management node as recited in claim 7, wherein the particular content is estimated to become popular at a specific content delivery node based on at least one of revenue data, search trend data, subscriber demographic data, and social media data obtained for the particular content.

12. A method operative at a management node associated with a content delivery network (CDN) configured to deliver adaptive streaming content, the method for effectuating efficient usage of network resources of the CDN and comprising:

monitoring historical network conditions associated with one or more content delivery nodes of the CDN for delivery of one or more adaptive bitrate (ABR) assets, wherein the historical network conditions corresponding to a particular content delivery node comprise performance conditions associated with downloading of various content files from the particular content delivery node over a configurable time window to a plurality of subscribers served by the particular content delivery node;

determining, for each content delivery node, one or more delivery rules based on the historical network conditions monitored for the ABR assets delivered over the configurable period of time;

obtaining a push policy for a particular content determined to become popular at a specific content delivery node, the push policy operating to facilitate pre-provisioning of the particular content at the specified content delivery node, and modulating the push policy to pre-provision only certain subsets of the one or more ABR assets of the particular content for delivery at the specific content delivery node based on the one or more delivery rules established for the specific content delivery node; and providing the modulated push policy to at least one of a central distribution node and a regional distribution node of the CDN for minimizing bandwidth cost for transmitting the particular content through the CDN with respect to servicing subscriber requests for the particular content at the specific content delivery node.

13. The method as recited in claim 12, wherein the ABR assets comprise at least one of video components, audio track components and one or more subtitle languages of the various content files delivered to the plurality of subscribers.

14. The method as recited in claim 12, wherein the performance conditions comprise at least one of content download rates sustained by respective content delivery nodes over the configurable time window, temporal performance variations of respective content delivery nodes compared against a threshold level, and relative performance of respective content delivery nodes in relation to an average performance level of a sample of the content delivery nodes monitored over the configurable time window.

15. The method as recited in claim 14, wherein the one or more delivery rules for a respective content delivery node comprise allowing for delivery of high bitrate content only if the respective content delivery node has sustained a high content download rate over the configurable time window.

16. The method as recited in claim 14, wherein the one or more delivery rules for a respective content delivery node comprise allowing for delivery of high bitrate content only if the respective content delivery node has sustained a relative performance that is higher than the average performance level of a sample of the content delivery nodes monitored over the configurable time window.

17. The method as recited in claim 12, wherein the content delivery nodes comprise one or more edge distribution nodes and one or more regional distribution nodes coupled to the central distribution node.

18. A management node operative with a content delivery network (CDN) configured to deliver adaptive streaming content, the management node adapted for effectuating efficient usage of network resources of the CDN and comprising:

one or more processors;

a database for storing historical network conditions associated with one or more content delivery nodes of the CDN for delivery of one or more adaptive bitrate (ABR) assets, wherein the historical network conditions corresponding to a particular content delivery node comprise performance conditions associated with downloading of various content files from the particular content delivery node over a configurable time window to a plurality of subscribers served by the particular content delivery node;

a delivery node management and control (DNMC) module embodied in a persistent memory coupled to the one or more processors, the DNMC module having instructions executable by the one or more processors and configured to determine, for each content delivery node, one or more delivery rules based on the historical network conditions monitored for the ABR assets delivered over the configurable time window; and a content pre-provisioning control module embodied in a persistent memory coupled to the one or more processors, the content pre-provisioning control module having instructions executable by the one or more processors and configured to:

obtain a push policy for a particular content determined to become popular at a specific content delivery node, the push policy operating to facilitate pre-provisioning of the particular content at the specified content node, and modulate the push policy to pre-provision only certain subsets of the one or more ABR assets of the particular content for delivery at the specific content delivery node based on the one or more delivery rules established for the specific content delivery node; and provide the modulated push policy to at least one of a central distribution node and a regional distribution node of the CDN for minimizing bandwidth cost for transmitting the particular content through the CDN with respect to servicing subscriber requests for the particular content at the specific content delivery node.

19. The management node as recited in claim 18, wherein the ABR assets comprise at least one of video components, audio track components and one or more subtitle languages of the various content files delivered to the plurality of subscribers.

20. The management node as recited in claim 18, wherein the performance conditions comprise at least one of content download rates sustained by respective content delivery nodes over the configurable time window, temporal performance variations of respective content delivery nodes compared against a threshold level, and relative performance of respective content delivery nodes in relation to an average performance level of a sample of the content delivery nodes monitored over the configurable time window.

21. The management node as recited in claim 20, wherein the DNMC module is operative to determine the one or more delivery rules for a respective content delivery node that allow for delivery of high bitrate content only if the respective content delivery node has sustained a high content download rate over the configurable time window.

22. The management node as recited in claim 20, wherein the DNMC module is operative to determine the one or more delivery rules for a respective content delivery node that allow for delivery of high bitrate content only if the respective content delivery node has sustained a relative performance that is higher than the average performance level of a sample of the content delivery nodes monitored over the configurable time window.

* * * * *